US012640495B2

(12) United States Patent
Bunga et al.

(10) Patent No.: US 12,640,495 B2
(45) Date of Patent: May 26, 2026

(54) BASE STATION ANTENNAS HAVING MULTI-BAND RADIATING UNITS THAT INCLUDE INTEGRATED FIRST AND SECOND FREQUENCY BAND RADIATING ELEMENTS

(71) Applicant: Outdoor Wireless Networks LLC, Claremont, NC (US)

(72) Inventors: Sekharbabu Bunga, Andhra Pradesh (IN); Nagaraju Mondi, Telangana (IN); Kumara Swamy Kasani, GodavariKahani (IN); Ligang Wu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 102 days.

(21) Appl. No.: 18/666,916

(22) Filed: May 17, 2024

(65) Prior Publication Data

US 2024/0388009 A1 Nov. 21, 2024

(30) Foreign Application Priority Data

May 19, 2023 (CN) ......................... 202310573400.0

(51) Int. Cl.
*H01Q 21/06* (2006.01)
*H01Q 1/24* (2006.01)
*H01Q 5/314* (2015.01)

(52) U.S. Cl.
CPC ........... *H01Q 21/062* (2013.01); *H01Q 1/246* (2013.01); *H01Q 5/314* (2015.01)

(58) Field of Classification Search
CPC ...... H01Q 1/1228; H01Q 1/246; H01Q 1/523; H01Q 1/50; H01Q 5/314; H01Q 5/42; H01Q 9/16; H01Q 15/0013; H01Q 19/02; H01Q 19/108; H01Q 19/18; H01Q 21/0006; H01Q 21/062; H01Q 21/26; H01Q 21/30
See application file for complete search history.

(56) References Cited

U.S. PATENT DOCUMENTS

2023/0098188 A1* 3/2023 Li ............................ H01Q 1/36
343/878

FOREIGN PATENT DOCUMENTS

CN 115663460 A * 1/2023 ............... H01Q 5/48
WO WO-2023050733 A1 * 4/2023 ............... H01Q 1/36

* cited by examiner

*Primary Examiner* — Hoang V Nguyen
(74) *Attorney, Agent, or Firm* — Myers Bigel, P.A.

(57) ABSTRACT

Base station antennas include a first array having a plurality of first frequency band radiating elements and a second array having a plurality of second frequency band radiating elements, where the second frequency band being different than the first frequency band. A first of the first frequency band radiating elements includes a first feed stalk and a first of the second frequency band radiating elements includes a second feed stalk that extends through an aperture in the first feed stalk.

20 Claims, 17 Drawing Sheets

BASE STATION ANTENNAS HAVING MULTI-BAND RADIATING UNITS THAT INCLUDE INTEGRATED FIRST AND SECOND FREQUENCY BAND RADIATING ELEMENTS

CROSS-REFERENCE TO RELATED APPLICATION

The present application claims priority under 35 U.S.C. § 119 to Chinese Application Serial No. 202310573400.0, filed May 19, 2023, the entire content of which is incorporated herein by reference.

FIELD

The present disclosure relates to communications systems and, in particular, to base station antennas for cellular communications systems.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Typically, the base station antennas are mounted on a tower or other raised structure, with the radiation patterns (also referred to herein as "antenna beams") that are generated by the base station antennas directed outwardly.

A common base station configuration is the three sector configuration in which a cell is divided into three 120° "sectors" in the azimuth (horizontal) plane, A separate base station antenna provides coverage (service) to each sector. Typically, each base station antenna will include multiple vertically-extending columns of radiating elements that operate, for example, using second generation ("2G"), third generation ("3G") or fourth generation ("4G") cellular network protocols. These vertically-extending columns of radiating elements are typically referred to as "linear arrays," and may be straight columns of radiating elements or columns in which some of the radiating elements are staggered horizontally. Most modern base station antennas include both "low-band" linear arrays of radiating elements that support service in some or all of the 617-960 MHz frequency band and "mid-band" linear arrays of radiating elements that support service in some or all of the 1427-2690 MHz frequency band. These linear arrays are typically formed using dual-polarized radiating elements, which allows each array to transmit and receive RF signals at two orthogonal polarizations.

Each of the above-described linear arrays is coupled to two ports of a radio (one port for each polarization). An RF signal that is to be transmitted by a linear array is passed from the radio to the antenna where it is divided into a plurality of sub-components, with each sub-component fed to a respective subset of the radiating elements in the linear array (typically each sub-component is fed to between one and three radiating elements). The sub-components of the RF signal are transmitted through the radiating elements to generate an antenna beam that covers a generally fixed coverage area, such as a sector of a cell. Typically these linear arrays will have remote electronic tilt ("RET") capabilities which allow a cellular operator to change the pointing angle of the generated antenna beams in the elevation (vertical) plane in order to change the size of the sector served by the linear array. Since the antenna beams generated by the above-described 2G/3G/4G linear arrays generate static antenna beams, they are often referred to as "passive" linear arrays.

Most cellular operators are currently upgrading their networks to support fifth generation ("5G") cellular service. One important component of 5G cellular service is the use of so-called multi-column "active" beamforming arrays that operate in conjunction with beamforming radios to dynamically adjust the size, shape and pointing direction of the antenna beams that are generated by the active beamforming array. These active beamforming arrays are typically formed using "high-band" radiating elements that operate in higher frequency bands, such as some or all of the 3.3-4.2 GHz and/or the 5.1-5.8 GHz frequency bands. The radiating elements in each column of such an active beamforming array are typically coupled to a respective port of a beamforming radio. The beamforming radio may be a separate device, or may be integrated with the active antenna array. The beamforming radio may adjust the amplitudes and phases of the sub-components of an RF signal that are fed to each port of the radio (and hence to each respective column of radiating elements in the multi-column beamforming array) in order to generate antenna beams that have narrowed beamwidths in the azimuth plane and/or elevation plane (and hence higher antenna gain). These narrowed antenna beams can be electronically steered by proper selection of the amplitudes and phases of the sub-components of an RF signal.

In order to avoid having to increase the number of antennas at cell sites, the above-described 5G antennas also often include passive linear arrays that support legacy 2G, 3G and/or 4G cellular services. In some cases, both the active beamforming arrays and the passive linear arrays may be included in a single base station antenna. Another solution for providing an antenna that supports both 2G/3G/4G and 5G cellular service is to mount a 5G active antenna module (i.e., a module that includes an active beamforming array and associated beamforming radio) on the rear surface of a passive base station antenna that includes a plurality of 2G, 3G, and/or 4G passive linear arrays. An opening is provided in the reflector of the passive base station antenna so that the antenna beams generated by the active beamforming array can be transmitted through the passive base station antenna. This design is advantageous as the active antenna module may be removable, and hence as enhanced 5G capabilities are developed, a cellular operator may replace the original active antenna module with an upgraded active antenna module without having to replace the passive base station antenna. Herein, the combination of a passive base station antenna that has an active antenna module mounted thereon is referred to as a "passive/active antenna system."

SUMMARY

Pursuant to embodiments of the present invention, base station antennas are provided that comprise a first array having a plurality of first frequency band radiating elements and a second array having a plurality of second frequency band radiating elements, the second frequency band being different than the first frequency band. A first of the first frequency band radiating elements includes a first feed stalk and a first of the second frequency band radiating elements includes a second feed stalk that extends through an aperture in the first feed stalk.

In some embodiments, the first feed stalk comprises a first feed stalk printed circuit board and the second feed stalk comprises a second feed stalk printed circuit board.

In some embodiments, the first of the second frequency band radiating elements includes a dipole radiator printed circuit board, and the first feed stalk printed circuit board extends through an opening in the dipole radiator printed circuit board.

In some embodiments, the first feed stalk intersects the second feed stalk at an angle of about 90°.

In some embodiments, the first of the second frequency band radiating elements further includes a third feed stalk printed circuit board that extends through the aperture in the first feed stalk. In such embodiments, the first feed stalk printed circuit board intersects the second feed stalk printed circuit board at an angle of about 45°. Moreover, the first feed stalk printed circuit board may intersect the third feed stalk printed circuit board at an angle of about −45°.

In some embodiments, the first feed stalk printed circuit board is the only feed stalk printed circuit board included in the first of the first frequency band radiating elements.

In some embodiments, the first of the first frequency band radiating elements and the first of the second frequency band radiating elements are both mounted on a feedboard printed circuit board. An axis that is perpendicular to a major surface of the feedboard printed circuit board may extend through a center of the first of the first frequency band radiating elements and through a center of the first of the second frequency band radiating elements.

In some embodiments, the first frequency band radiating elements are configured to operate in at least a portion of the 617-960 MHz frequency band, and the second frequency band radiating elements are configured to operate in at least a portion of the 1427-2690 MHz frequency band. In such embodiments, a first radiator of the first of the first frequency band radiating elements is mounted farther forward than a first radiator of the first of the second frequency band radiating elements.

In some embodiments, the base station may further comprise a frequency selective surface mounted rearward of the first of the first frequency band radiating elements and rearward of the first of the second frequency band radiating elements, and a third antenna array having a plurality of third frequency band radiating elements that are mounted rearward of the frequency selective surface, where the third frequency band radiating elements are configured to operate in at least a portion of the 3.1-5.8 GHz frequency band. The frequency selective surface may be configured to be substantially transparent to RF energy in the third frequency band and to substantially reflect RF energy in at least one of the first and second frequency bands.

In some embodiments, the first of the first frequency band radiating elements may be a first crossed-dipole radiating element, the first of the second frequency band radiating elements may be a second crossed-dipole radiating element, a first dipole of the second crossed-dipole radiating element overlaps, in a forward direction, a first dipole of the first crossed-dipole radiating element, and a second dipole of the second crossed-dipole radiating element overlaps, in the forward direction, a second dipole of the first crossed-dipole radiating element.

In some embodiments, the first feed stalk printed circuit board is mounted to extend forwardly from a major surface of a feedboard printed circuit board, the major surface extending in a horizontal direction and a vertical direction, and a distal end of the first feed stalk printed circuit board is offset from a base of the first feed stalk printed circuit board in the forward direction and in at least one of the horizontal and vertical directions.

Pursuant to further embodiments of the present invention, base station antennas are provided that comprise a reflector, a first radiating element that is configured to operate in a first frequency band, the first radiating element including a first feed stalk that extends in a forward direction and first through fourth dipole arms, and a second radiating element that is configured to operate in a second frequency band, the second radiating element including a second feed stalk that extends in the forward direction and fifth through eighth dipole arms, the second frequency band being different than the first frequency band. The first feed stalk extends in between the fifth dipole arm and the seventh dipole arm.

In some embodiments, the first feed stalk also extends in between the sixth dipole arm and the eighth dipole arm.

In some embodiments, the first feed stalk comprises a first feed stalk printed circuit board and the second feed stalk comprises a second feed stalk printed circuit board.

In some embodiments, the first radiating element includes a dipole radiator printed circuit board, and the first feed stalk printed circuit board extends through an opening in the dipole radiator printed circuit board.

In some embodiments, the second feed stalk extends through an aperture in the first feed stalk.

In some embodiments, the first feed stalk intersects the second feed stalk at an angle of about 90°.

In some embodiments, the second radiating element further includes a third feed stalk printed that extends through the aperture in the first feed stalk. In some embodiments, the first feed stalk intersects the second feed stalk at an angle of about 45° and intersects the third feed stalk at an angle of about −45°.

In some embodiments, the first feed stalk printed circuit board is the only feed stalk printed circuit board included in the first radiating element.

In some embodiments, the first radiating element and the second radiating element are mounted on a feedboard printed circuit board, and an axis that is perpendicular to a major surface of the feedboard printed circuit board extends through a center of the first of the first radiating element and through a center of the second radiating element.

In some embodiments, the first radiating element is configured to operate in at least a portion of the 617-960 MHz frequency band, and the second radiating element is configured to operate in at least a portion of the 1427-2690 MHz frequency band. In some embodiments, the first through fourth dipole arms are mounted farther forwardly than are the fifth through eighth dipole arms.

In some embodiments, first dipole arm overlaps, in a forward direction, the fifth dipole arm, and the second dipole arm overlaps, in the forward direction, the sixth dipole arm.

In some embodiments, the first feed stalk printed circuit board is mounted to extend forwardly from a major surface of a feedboard printed circuit board, the major surface extending in a horizontal direction and a vertical direction, and a distal end of the first feed stalk printed circuit board is offset from a base of the first feed stalk printed circuit board in the forward direction and in at least one of the horizontal and vertical directions.

Pursuant to additional embodiments of the present invention, multi-band radiating units are provided that comprise a first cross-dipole radiating element that includes a first dipole radiator, a second dipole radiator and a first feed stalk printed circuit board that has feed lines for both the first dipole radiator and the second dipole radiator and a second cross-dipole radiating element that third dipole radiator and a fourth dipole radiator, a second feed stalk printed circuit board and a third feed stalk printed circuit board. The first feed stalk printed circuit board intersects the second feed stalk printed circuit board and the third feed stalk printed circuit board, and the first and second dipole radiators are configured to operate in a different frequency band than are the third and fourth dipole radiators.

In some embodiments, the third and fourth dipole radiators are implemented on a dipole radiator printed circuit board, and the first feed stalk printed circuit board extends through an opening in the dipole radiator printed circuit board.

In some embodiments, the first feed stalk printed circuit board intersects the second feed stalk printed circuit board at an angle of about 90°.

In some embodiments, the first feed stalk printed circuit board intersects the second feed stalk printed circuit board at an angle of about 45°.

In some embodiments, the first feed stalk printed circuit board is the only feed stalk printed circuit board included in the first radiating element.

In some embodiments, the first cross-dipole radiating element and the second cross-dipole radiating element are coaxially mounted on a feedboard printed circuit board.

In some embodiments, the first cross-dipole radiating element is configured to operate in a lower frequency band than the second cross-dipole radiating element, and the first dipole radiator is mounted farther forward than the third dipole radiator.

In some embodiments, the first feed stalk printed circuit board is mounted to extend forwardly from a major surface of a feedboard printed circuit board, the major surface extending in a horizontal direction and a vertical direction, and a distal end of the first feed stalk printed circuit board is offset from a base of the first feed stalk printed circuit board in the forward direction and in at least one of the horizontal and vertical directions.

In still other embodiments, base station antennas are provided that include a reflector, first through third columns of first frequency band radiating elements arranged from left to right on the reflector in numerical order, and first through sixth columns of second frequency band radiating elements arranged from left to right on the reflector in numerical order, the second frequency band encompassing higher frequencies than the first frequency band. The first through third columns of first frequency band radiating elements form first and second arrays of first frequency band radiating elements, and the first through sixth columns of second frequency band radiating elements form first through fourth arrays of second frequency band radiating elements.

In some embodiments, at least some of the first frequency band radiating elements in the first column of first frequency band radiating elements are implemented as multi-band radiating units that each include one of the first frequency band radiating elements and a corresponding one of the second frequency band radiating elements.

In some embodiments, the corresponding ones of the second frequency band radiating elements are in the second column of second frequency band radiating elements.

In some embodiments, the second column of first frequency band radiating elements is interposed between the third and fourth columns of second frequency band radiating elements.

In some embodiments, the second frequency band radiating element of a first of the multi-band radiating units comprises a dipole radiator printed circuit board, and a feed stalk printed circuit board of the first frequency band radiating element of the first of the multi-band radiating units extends through an opening in the dipole radiator printed circuit board.

In some embodiments, the first frequency band radiating element of a first of the multi-band radiating units comprises a first feed stalk printed circuit board and the second frequency band radiating element of the first of the multi-band radiating units comprises a second feed stalk printed circuit board that extends through an aperture in the first feed stalk printed circuit board.

DETAILED DESCRIPTION

Figure 1A:
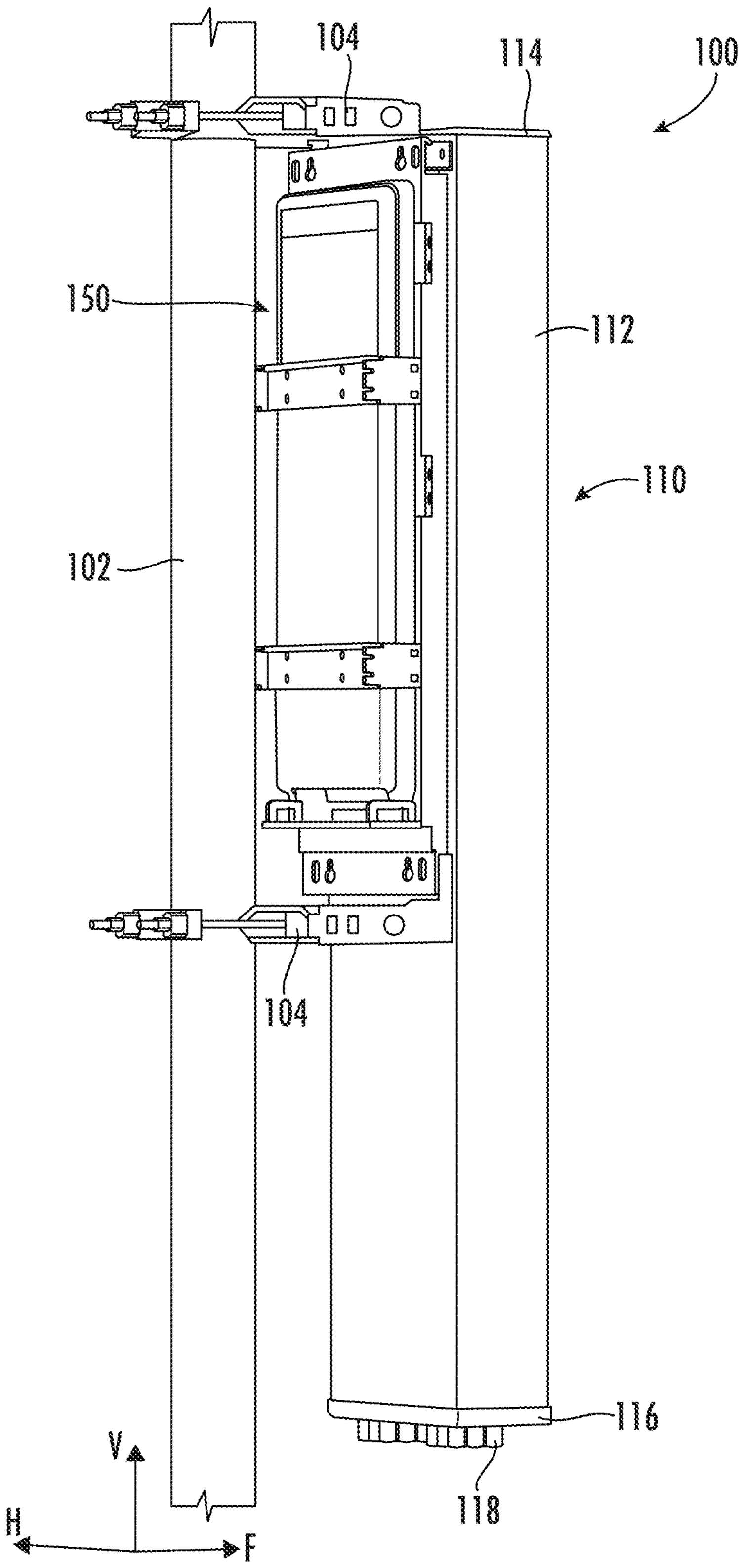
FIG. 1A is a schematic rear perspective view of a passive/active antenna system that comprises a passive base station antenna that has an active antenna module mounted thereon.

Though it may be advantageous to fit low-band, mid-band, and high-band radiating elements in the same base station antenna, arrays of radiating elements that operate in different frequency bands can negatively impact RF performance of each other. Accordingly, to improve performance of a base station antenna, it may be beneficial, for example, to reduce the impact of low-band and mid-band radiating elements on the high-band radiating elements. Pursuant to embodiments of the present invention, base station antennas are provided that can reduce the impact that the low-band and mid-band radiating elements have on the high-band radiating elements by including multi-band radiating units in the antenna that comprise a low-band radiating element that is integrated with a mid-band radiating element. For a base station antenna system that includes both a passive base station antenna having low-band and mid-band linear arrays and an active antenna module having one or more multi-column arrays of high-band radiating elements, the use of these multi-band radiating units can reduce the extent to which the radiating elements of the passive base station antenna shield the high-band radiating elements of the active antenna module, and can thereby improve the performance of the active antenna module.

The multi-band radiating units according to embodiments of the present invention may also be used to decrease the size of passive base station antennas and/or increase the performance thereof. For example, the use of the multi-band radiating units according to embodiments of the present invention may eliminate the need to vertically stack linear arrays in some antenna designs. This may allow the upper arrays of conventional passive base station antennas to be relocated to the bottom portion of the antenna, which decreases the length (and hence the cost) of the feed cables for such arrays. Moreover, since RF feed cables typically exhibit non-negligible insertion losses, the use of shorter cables may meaningfully increase the gain of the relocated arrays.

In some embodiments, the multi-band radiating units may comprise a low-band radiating element and a mid-band radiating element, where the feed stalk for the low-band radiating element extends in between and/or through the radiators of the mid-band radiating element. The feed stalk for the low-band radiating element may also intersect the feed stalk for the mid-band radiating element. As a result, the mid-band radiating element may be completely within the footprint of the low-band radiating element.

The multi-band radiating units according to embodiments of the present invention may be used in base station antennas. For example, in some embodiments, base station antennas are provided that include a first array having a plurality of first frequency band radiating elements and a second array having a plurality of second frequency band radiating elements, where the second frequency band is different from the first frequency band. In these antennas, a first of the first frequency band radiating elements and a first of the second frequency band radiating elements may be implemented using a multi-band radiating unit according to embodiments of the present invention. In such base station antennas, the first of the second frequency band radiating elements may include a second feed stalk that extends through an aperture in a first feed stalk of the first of the first frequency band radiating elements. The first of the second frequency band radiating elements may further include a dipole radiator printed circuit board, and the first feed stalk may extend through an opening in the dipole radiator printed circuit board. The dipole radiator printed circuit board may include first through fourth dipole arms, and the first feed stalk may extend in between the first and third dipole arms.

Example embodiments of the present invention will be described in greater detail with reference to the attached figures.

Figure 1B:
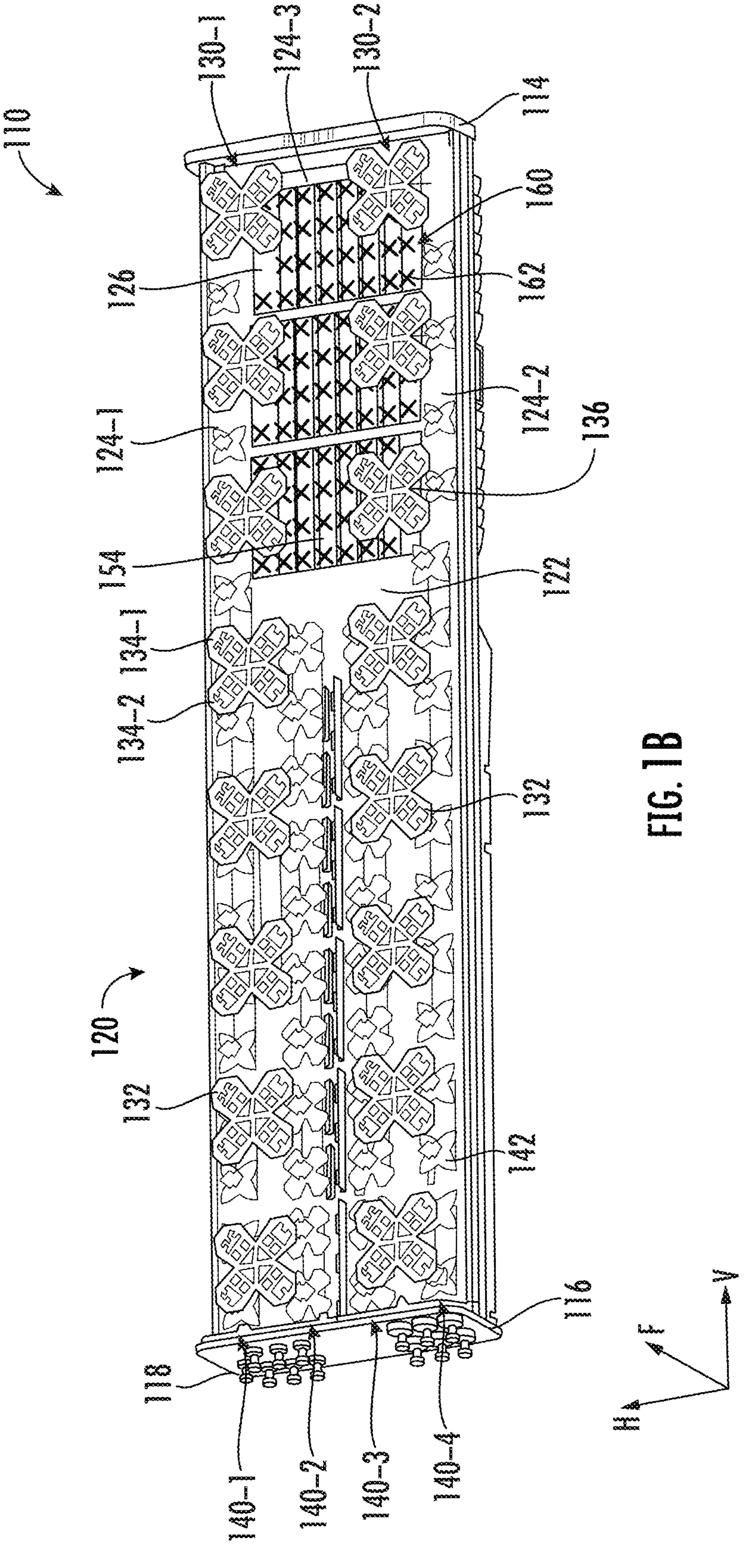
FIG. 1B is a schematic perspective view of the passive/active antenna system of FIG. 1A with a radome of the passive base station antenna removed.
Figure 1C:
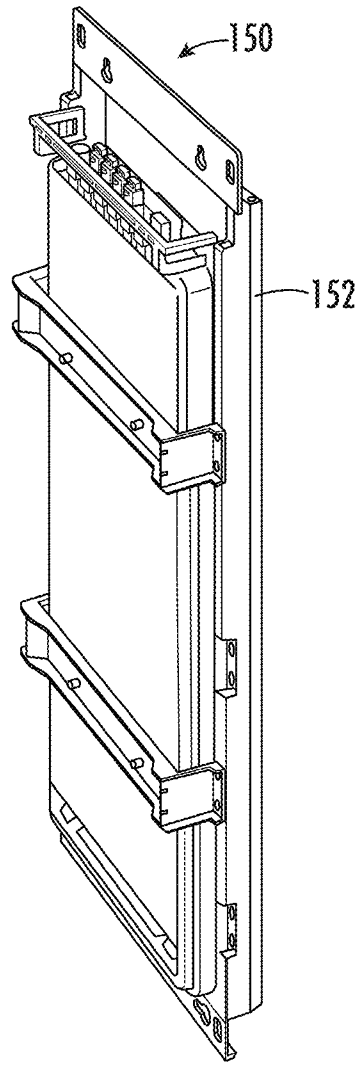
FIG. 1C is a perspective view of the active antenna module of the passive/active antenna system of FIGS. 1A-1B.

FIGS. 1A-1C illustrate a passive/active antenna system 100 that includes both a passive base station antenna 110 and an active antenna module 150. In particular, FIG. 1A is a schematic rear perspective view of the passive/active antenna system 100. FIG. 1B is a schematic perspective view of the passive/active antenna system 100 of FIG. 1A with a radome of the passive base station antenna 110 omitted. FIG. 1C is a perspective view of the active antenna module 150 shown in FIG. 1A. In FIGS. 1A and 1B, the axes illustrate the vertical (V), horizontal (H) and forward (F) directions of the base station antenna system 100.

Referring to FIG. 1A, the passive/active antenna system 100 may be mounted, for example, on an antenna tower 102 using mounting hardware 104. The passive/active antenna system 100 includes the passive base station antenna 110 and the active antenna module 150. The active antenna module 150 is mounted behind the passive base station antenna 110. The active antenna module 150 may be mounted directly on a rear surface of the passive base station antenna 110, or may be held in place behind the passive base station antenna 110 by, for example, the mounting hardware 104 that is used to mount the passive/active antenna system 100 on the antenna tower 102 (or other structure). The front surface of the passive/active antenna system 100 may be opposite the antenna tower 102 facing toward a coverage area of the passive/active antenna system 100. The passive base station antenna 110 includes a tubular radome 112 that surrounds and protects an antenna assembly that is mounted inside the radome 112. A top end cap 114 covers a top opening in the radome 112 and a bottom end cap 116 covers a bottom opening in the radome 112. A plurality of RF ports 118 extend through the bottom end cap 116 and are used to connect the passive base station antenna 110 to one or more external radios (not shown). The active antenna module 150 may be removably mounted behind the passive base station antenna 110 so that the active antenna module 150 may later be replaced with a different active antenna module, preferably without removing the passive base station antenna 110 from the antenna tower 102.

Referring to FIG. 1B, the passive base station antenna 110 includes a reflector assembly 120 and a plurality of passive linear arrays of radiating elements that extend forwardly from the passive reflector assembly 120. The linear arrays may support, for example, 3G and/or 4G cellular service. In the example passive base station antenna 110 shown in FIGS. 1A-1B, the linear arrays include first and second low-band linear arrays 130-1, 130-2 that are configured to operate in all or part of the 617-960 MHz frequency band. Each low-band linear array 130 comprises a vertically-extending column of low-band radiating elements 132. The passive base station antenna 110 further includes first through fourth mid-band linear arrays 140-1 through 140-4 that are configured to operate in all or part of the 1427-2690 MHz frequency band. Each mid-band linear array 140 comprises a vertically-extending column of mid-band radiating elements 142. Each of the low-band and mid-band linear arrays 130, 140 may generate relatively static antenna beams that provide coverage to a predefined coverage area (e.g., antenna beams that are each configured to cover a sector of a base station), with the only change to the coverage area occurring when the electronic downtilt angles of the generated antenna beams are adjusted (e.g., to change the size of the cell).

Each of the low-band and mid-band radiating elements 132, 142 may be implemented as dual-polarized radiating elements that include first and second radiators that transmit and receive RF energy at orthogonal polarizations. When such dual-polarized radiating elements are used, each of the low-band and mid-band linear arrays 130, 140 may be connected to a pair of the RF ports 118. The first RF port 118 is connected between a first port of a radio (e.g., a remote radio head mounted on the antenna tower 102 near the passive base station antenna 110) and the first polarization radiators of the radiating elements in the array, and the second RF port 118 is connected between a second port of a radio and the second polarization radiators of the radiating elements in the array. RF signals that are to be transmitted by a selected one of the linear arrays 130, 140 are passed from the radio to one of the RF ports 118, and passed from the RF port 118 to a power divider (or, alternatively, a phase shifter assembly that includes a power divider) that divides the RF signal into a plurality of sub-components that are fed to the respective first or second radiators of the radiating elements in the linear array, where the sub-components are radiated into free space.

The passive reflector assembly 120 includes a main reflector 122 and spaced-apart first and second reflector strips 124-1, 124-2 that extend vertically from respective first and second opposed sides of the main reflector 122. The passive reflector assembly 120 may further include a third reflector strip 124-3 that extends in the horizontal direction between the first and second reflector strips 124-1, 124-2. An opening 126 is defined between the first and second reflector strips 124-1, 124-2. For example, the opening 126 may be bounded by a top portion of the main reflector 122, the first and second reflector strips 124-1, 124-2, and the third reflector strip 124-3. Most of the low-band and mid-band radiating elements 132, 142 are mounted to extend forwardly from the main reflector 122. However, low-band linear arrays 130-1, 130-2 and mid-band linear arrays 140-2, 140-3 each extend substantially the full length of the passive/active antenna system 100 and hence extend beyond the main reflector 122. The first and second reflector strips 124-1, 124-2 provide mounting locations for low-band radiating elements 132 that are positioned above the main reflector 122. The first and second reflector strips 124-1, 124-2 may be integral with the main reflector 122 so that the first and second reflector strips 124-1, 124-2 and the main reflector 122 will be maintained at a common ground voltage, which may be important for the performance of the linear arrays 130-1, 130-2, 140-2, 140-3.

Each low-band radiating element 132 may comprise a slant −45°/+45° cross-dipole radiating element that includes a −45° dipole radiator 134-1 and a +45° dipole radiator 134-2 that are arranged to form a cross when the radiating element 132 is viewed from the front. The dipole radiators 134 may (but need not) extend in a plane that is parallel to a plane defined by the main reflector 122.

The dipole radiators 134-1, 134-2 may be mounted on a feed stalk 136 of the radiating element 132. Conventionally, cross-dipole radiating elements extend forwardly from a main reflector surface of a reflector assembly with the feed stalks of the radiating elements extending perpendicularly to the main reflector surface. The feed stalk may be configured to pass RF signals between the dipole radiators and an associated feed network, and may also be used to support the dipole radiators forwardly of the reflector assembly. The radiating elements 132 that extend forwardly from the main reflector 122 may have a conventional design where the feed stalks extend perpendicularly to the main reflector 122. However, the centers of the low-band radiating elements 132 that are mounted on the first and second reflector strips 124-1, 124-2 are above the opening 126, and hence conventional radiating elements cannot be readily used. Thus, the three uppermost low-band radiating elements 132 have so-called "tilted" feed stalks 136 that extend forwardly from the reflector strips 124-1, 124-2 at oblique angles. In particular, the base of each feed stalk 136 is mounted on one of the reflector strips 124-1, 124-2, and the feed stalk 136 extends at an angle so that the center of the cross defined by the dipole radiators 134-1, 134-2 is above the opening 126. In example embodiments, the feed stalks 136 may extend at an angle of about 30°-60° with respect to the front surface of the reflector strips 124-1, 124-2.

Referring to FIGS. 1B and 1C, the active antenna module 150 includes a multi-column beamforming array 160 of radiating elements 162 and a beamforming radio (not visible in the figures). The multi-column beamforming array 160 may be mounted behind a front radome 152 of the active antenna module 150, and the beamforming radio may be mounted behind the multi-column beamforming array 160. The beamforming array 160 may, for example, comprise a plurality of vertically-extending columns of high-band radiating elements 162 that are configured to operate in all or part of the 3.1-4.2 GHz frequency band. The high-band radiating elements 162 are mounted to extend forwardly from a reflector 154 of the active antenna module 150. The beamforming radio is capable of electronically adjusting the amplitudes and/or phases of the subcomponents of an RF signal that are output to different radiating elements 162 of the multi-column beamforming array 160. For example, each port of the beamforming radio may be coupled to a column of radiators of the beamforming array 160, and the amplitudes and phases of the sub-components of the RF signal that are fed to the radiators in each column may be adjusted so that the generated antenna beam is narrowed in the azimuth plane and pointed in a desired direction in the azimuth plane.

As is shown in FIG. 1B, the beamforming array 160 of active antenna module 150 is mounted behind the opening 126 in the passive reflector assembly 120. The beamforming array 160 is visible in FIG. 1B as the radomes 112, 152 of both the passive base station antenna 110 and the active antenna module 150 are removed in the view of FIG. 1B. The opening 126 in the passive reflector assembly 120 allows the antenna beams generated by the beamforming array 160 to pass through the passive base station antenna 110 and out of the front of the radome 112 of the passive base station antenna 110 to provide service to the coverage area of the passive/active antenna system 100.

In some embodiments, the opening 126 in the passive reflector assembly 120 may be covered by a frequency selective surface 128. The frequency selective surface 128 may act as a spatial filter that passes, or substantially attenuates and/or reflects RF energy, depending on the frequency of the RF energy. Frequency selective surfaces are known in the art, and typically comprise a grid pattern of unit cells such as a grid pattern of metal patches and/or other metal structures that form resonant circuits. The metal patches/structures may be arranged in one or more layers. The frequency selective surface 128 may be implemented, for example, as a piece of sheet metal with the grid structure punched or otherwise formed therein or as a dielectric substrate with one or more metal patterns formed therein (such as a printed circuit board). The frequency selective surface 128 may be configured to substantially pass RF energy that is incident thereon in a first frequency range (here the first frequency range may include the operating frequency band of the radiating elements included in the multi-column array 160 of high-band radiating elements 162 in active antenna module 150), while partially or substantially attenuating (e.g., reflecting) RF energy that is incident thereon in a second frequency range (here the second frequency range may include the operating frequency bands of the radiating elements included in the passive base station antenna 110). Examples of frequency selective surfaces are discussed in U.S. Pat. No. 11,482,774 to Hou et al., the entire content of which is incorporated herein by reference.

Figure 2A:
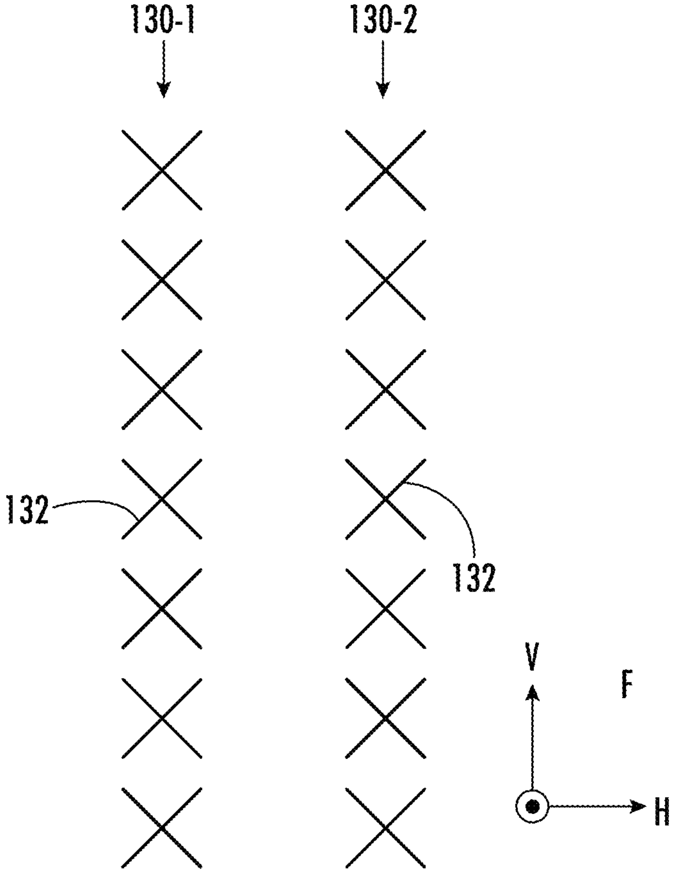
FIG. 2A is an example schematic front view of low-band arrays included in the passive/active antenna system of FIG. 1A.

FIG. 2A is an example schematic front view of the two low-band arrays 130-1, 130-2 that are included in the passive/active antenna system 100 of FIGS. 1A-1C. The two low-band arrays 130-1, 130-2 are spaced apart from each other in a horizontal direction H. Each low band 130 array includes a plurality of low-band radiating elements 132 and may extend in a vertical direction V from a lower portion of the passive/active antenna system 100 to an upper portion thereof. Each low-band array 130 may thus be referred to as a "vertical column." The vertical direction V may be, or may be parallel with, a longitudinal axis of the passive base station antenna. The vertical direction V may also be perpendicular to the horizontal direction H and a forward direction F. As used herein, the term "vertical" does not necessarily require that something is exactly vertical (e.g., the passive/active antenna system 100 may have a small mechanical down-tilt).

The low-band arrays 130 are each configured to transmit and/or receive RF signals in one or more frequency bands, such as all or part of the 617-960 MHz frequency band. Though FIG. 2A illustrates two arrays 130-1, 130-2, the passive base station antenna 110 may include more or fewer low-band arrays 130. Moreover, the number of radiating elements 132 included in each low-band array 130 can be any quantity from two to twenty or more, with five to nine radiating elements being most typical.

Figure 2B:
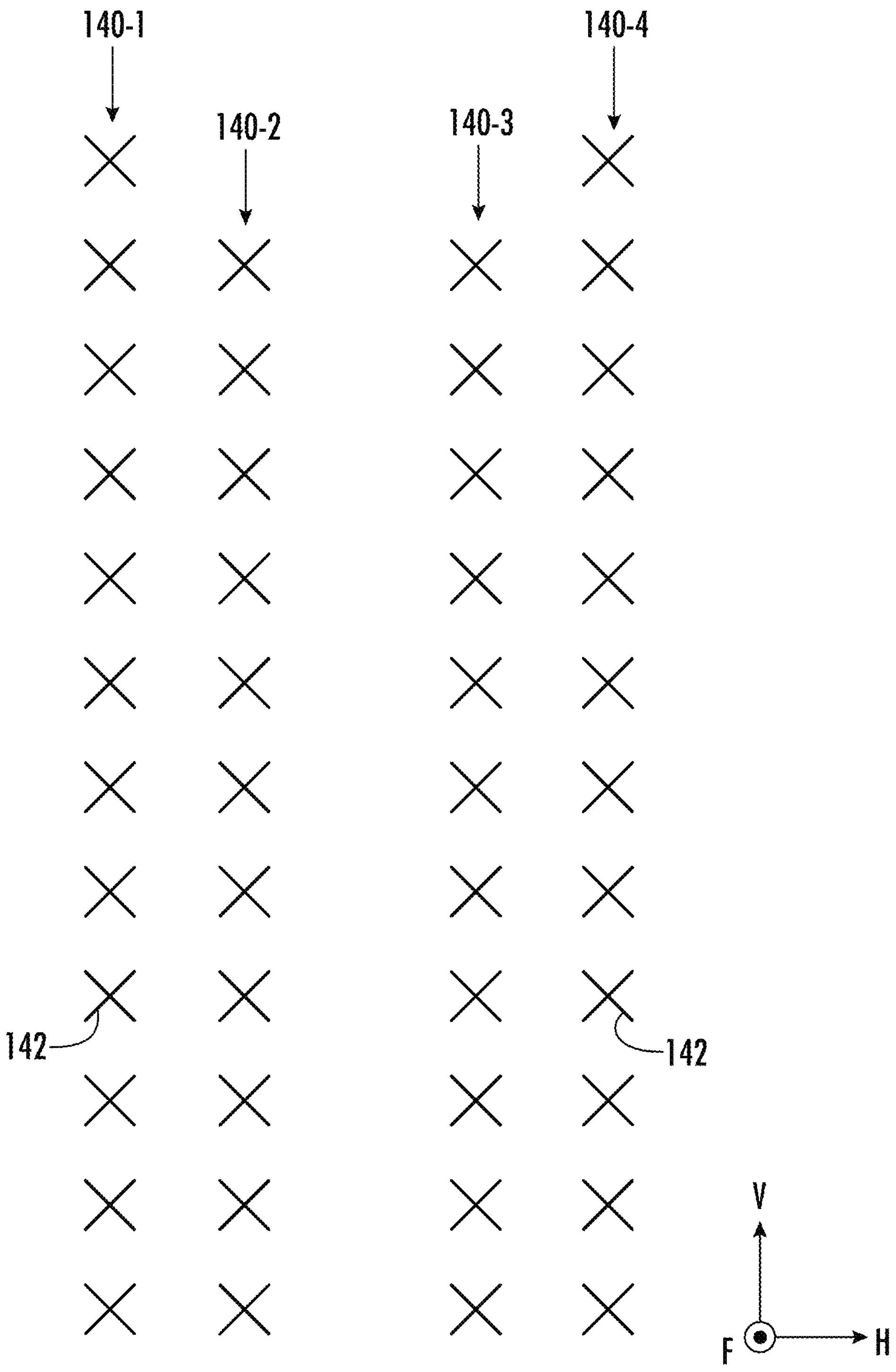
FIG. 2B is an example schematic front view of mid-band arrays included in the passive/active antenna system of FIG. 1A.

FIG. 2B is an example schematic front view of the four mid-band arrays 140-1 to 140-4 that are included in the passive base station antenna 110 of FIG. 1A. The four mid-band arrays 140-1 to 140-4 are spaced apart from each other in the horizontal direction H. Each mid-band array 140 (e.g., vertical column) includes a plurality of mid-band radiating elements 142 and may extend in the vertical direction V.

The mid-band arrays 140 are each configured to transmit and/or receive RF signals in one or more frequency bands, such as in all or a portion of the 1427-2690 MHz frequency band. Though FIG. 2B illustrates four mid-band arrays 140-1 to 140-4, the passive base station antenna 110 may include more (e.g., five or more) or fewer (e.g., two or three) mid-band arrays 140. Moreover, the number of radiating elements 142 in each mid-band array 140 can be any quantity from two to twenty or more.

Figure 2C:
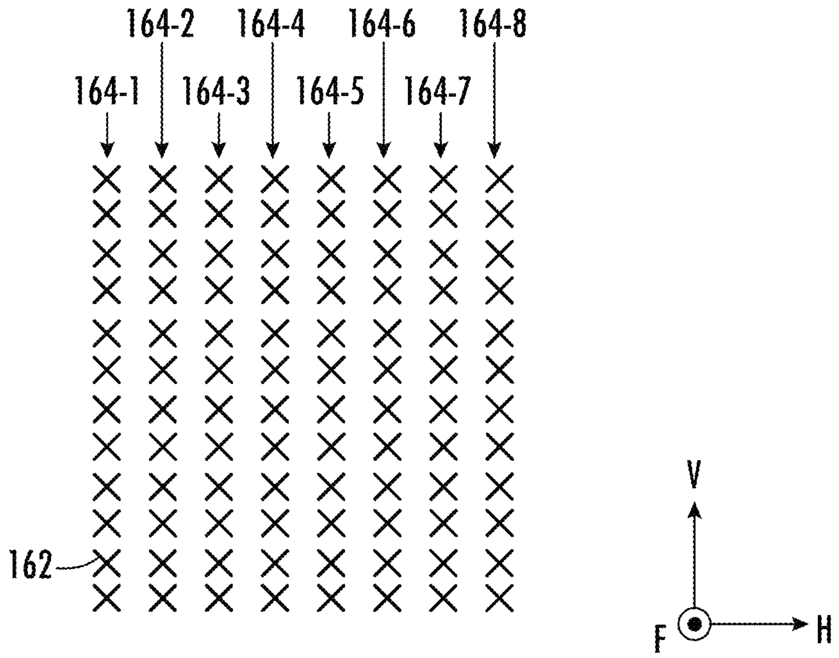
FIG. 2C is an example schematic front view of the multi-column high-band array included in the passive/active antenna system of FIG. 1A.

FIG. 2C is an example schematic front view of a multi-column array 160 of high-band radiating elements 162 that is included in the active antenna module 150 of FIGS. 1A-1C. The high-band array 160 include eight columns 164-1 through 164-8 of high-band radiating elements 162. The eight columns 164 are spaced apart from each other in the horizontal direction H. Each column 164 may extend in the vertical direction V from a lower portion of the active antenna module 150 to an upper portion thereof.

The high-band array 160 is configured to transmit and/or receive RF signals in one or more frequency bands, such as one or more bands comprising 3.1-4.2 GHz (e.g., 3.3-4.2 GHz). Though FIG. 2C illustrates an eight column high-band array 160, the high-band array 160 may include more or fewer columns 164 of radiating elements 162. Moreover, the number of radiating elements 162 in each column 164 can be any quantity from two to twenty or more.

Figure 3A:
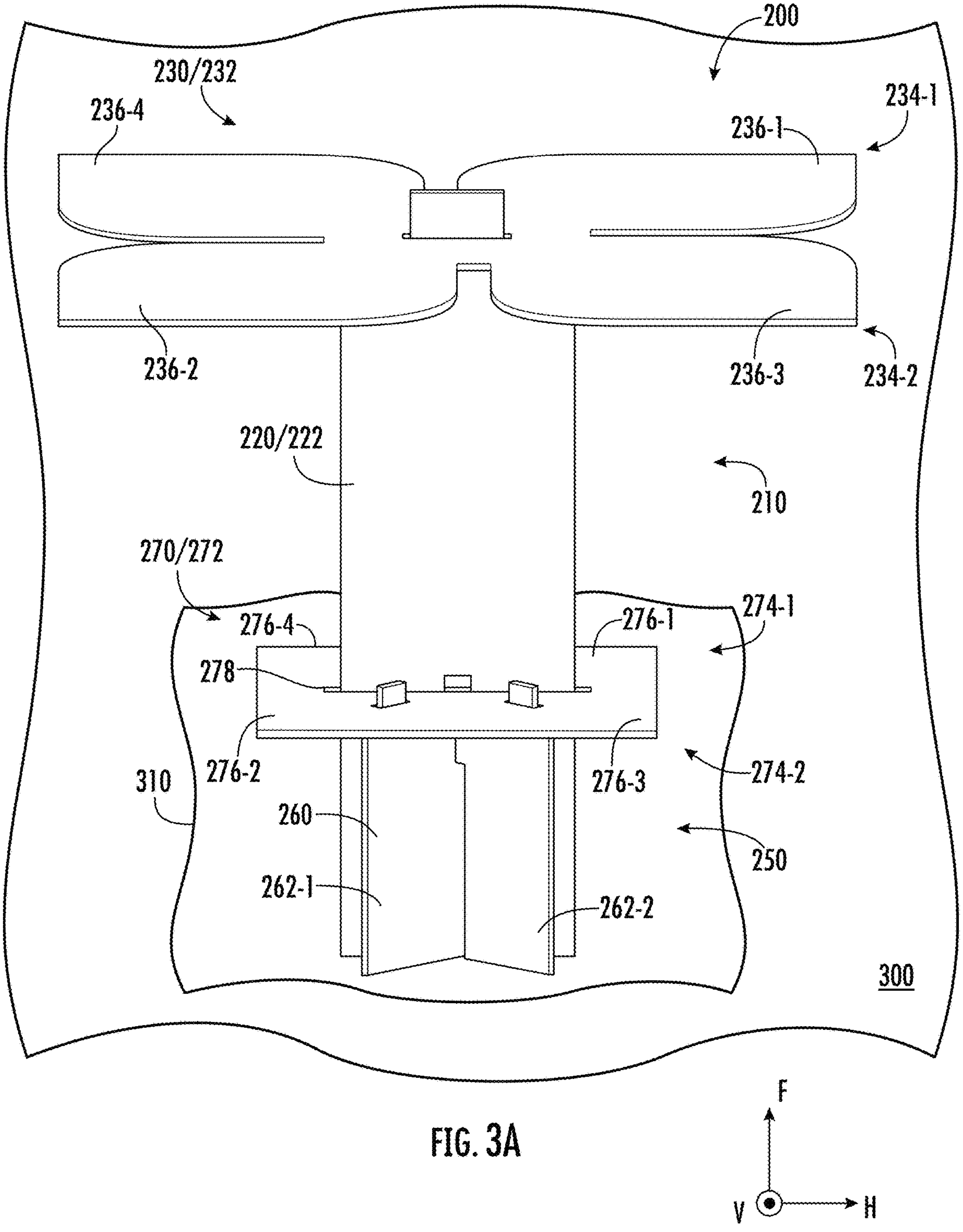
FIG. 3A is a schematic perspective view of a multi-band radiating unit according to embodiments of the present invention.
Figure 3B:
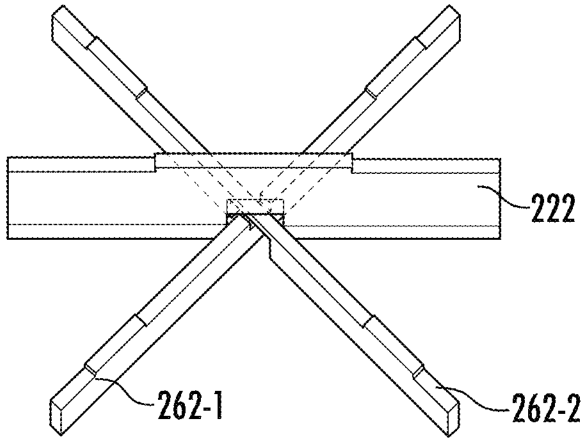
FIG. 3B is a schematic top shadow perspective view of the feed stalks included in the multi-band radiating unit of FIG. 3A.
Figure 3C:
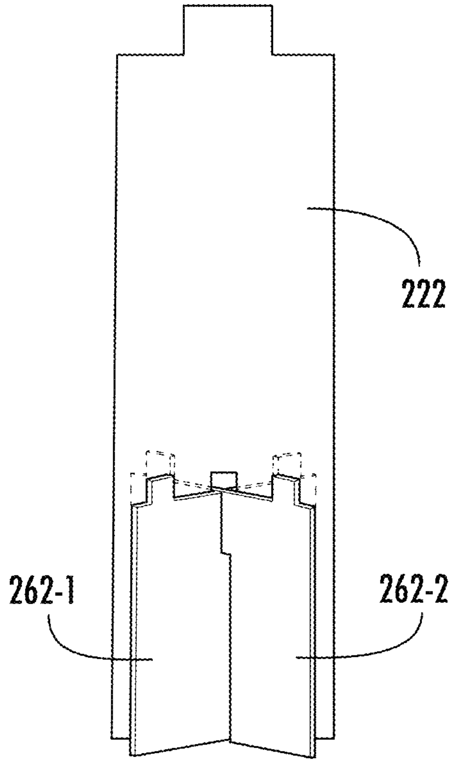
FIG. 3C is a schematic side shadow perspective view of the feed stalks included in the multi-band radiating unit of FIG. 3A.
Figure 3D:
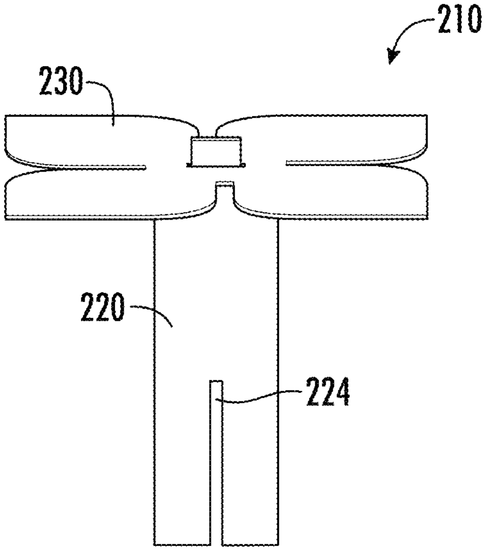
FIG. 3D is a schematic perspective view of the lower-band radiating element included in the multi-band radiating unit of FIG. 3A.
Figure 3E:
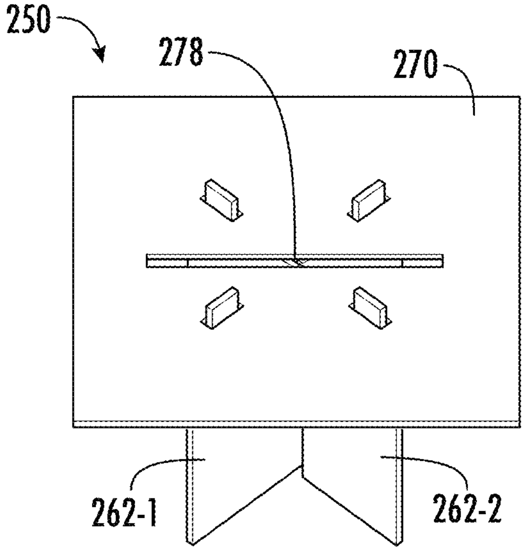
FIG. 3E is a schematic perspective view of the higher-band radiating element included in the multi-band radiating unit of FIG. 3A.

FIG. 3A is a schematic perspective view of a multi-band radiating unit 200 according to embodiments of the present invention. FIGS. 3B and 3C are schematic top and side shadow perspective views, respectively, of the feed stalks included in the multi-band radiating unit 200 of FIG. 3A. FIGS. 3D and 3E are schematic perspective views of the lower-band and higher-band radiating elements 210, 250, respectively, that are included in the multi-band radiating unit 200 of FIG. 3A.

Referring to FIGS. 3A-3E, the multi-band radiating unit 200 includes a first, lower-band, radiating element 210 and a second, higher-band, radiating element 250. The first, lower-band, radiating element 210 includes a feed stalk 220 and a radiating unit 230. The feed stalk 220 may be implemented, for example, as a feed stalk printed circuit board 222 (e.g., microstrip printed circuit board with metal feed and ground lines printed on either side of a dielectric substrate). The radiating unit 230 may comprise, for example, a dipole radiator printed circuit board 232. In the depicted embodiment, first and second dipole radiators 234-1, 234-2 are formed in the dipole radiator printed circuit board 232. The first dipole radiator 234-1 may include first and second center-fed dipole arms 236-1, 236-2. The second dipole radiator 234-2 may include third and fourth center-fed dipole arms 236-3, 236-4. The first dipole radiator 234-1 may extend at an angle of about +45° with respect to a plane defined by the horizon when a base station antenna including the multi-band radiating unit 200 is mounted for ordinary use, and the second dipole radiator 234-2 may extend at an angle of about −45° with respect to a plane defined by the horizon. Thus, the lower-band radiating element 210 may comprise a slant −/+45° crossed-dipole radiating element. As shown, a single feed stalk printed circuit board 232 is used to feed both dipole radiators 234-1, 234-2 on the dipole radiator printed circuit board 232.

The first, higher-band, radiating element 250 includes a feed stalk 260 and a radiating unit 270. The feed stalk 260 is implemented using first and second feed stalk printed circuit boards 262-1, 262-2 (e.g., a pair of microstrip printed circuit boards). The first and second feed stalk printed circuit boards 262-1, 262-2 have corresponding slots formed therein so that they may be mated together extending perpendicular to each other, as shown in FIGS. 3A and 3E and as is well known in the art. The radiating unit 270 may comprise, for example, a dipole radiator printed circuit board 272. First and second dipole radiators 274-1, 274-2 are formed in the dipole radiator printed circuit board 272. The first dipole radiator 274-1 may include first and second center-fed dipole arms 276-1, 276-2. The second dipole radiator 274-2 may include third and fourth center-fed dipole arms 276-3, 276-4. The first dipole radiator 274-1 may extend at an angle of about +45° with respect to a plane defined by the horizon when a base station antenna including the multi-band radiating unit 200 is mounted for ordinary use, and the second dipole radiator 274-2 may extend at an angle of about −45° with respect to a plane defined by the horizon. Thus, the higher-band radiating element 250 may also comprise a slant −/+45° crossed-dipole radiating element.

As shown, the lower-band radiating element 210 may extend through the higher-band radiating element 250. In particular, the dipole radiator printed circuit board 272 of the higher-band radiating element 250 may include an opening 278 such as a slot. The opening 278 may extend through a middle of the dipole radiator printed circuit board 272. The feed stalk printed circuit board 222 of the lower-band radiating element 210 may extend through the opening 278. The feed stalk printed circuit board 222 of the lower-band radiating element 210 may also include a rearwardly extending aperture 224 such as a slit The first and second feed stalk printed circuit boards 262-1, 262-2 of the higher-band radiating element 250 extend through the aperture 224. This arrangement allows the lower-band and higher-band radiating elements 210, 250 to be formed as an "integrated" multi-band radiating unit 200 in which the higher-band radiating element 250 is completely within the footprint of the lower-band radiating element 210 such that the higher-band radiating element 250 cannot be seen when the multi-band radiating unit 200 is viewed from the front (see FIG. 3F).

As is shown in FIG. 3A, both the lower-band and higher-band radiating elements 210, 250 may be mounted on a common feedboard printed circuit board 300. The feedboard printed circuit board 310 may, for example, be mounted on the front side of a reflector 300 of a base station antenna in some embodiments. Since the feed stalk printed circuit board 222 for the lower-band radiating element 210 extends through the higher-band radiating element 250, all three feed stalk printed circuit boards 222, 262-1, 262-2 of the multi-band radiating unit 200 may contact (and typically extend through) the feedboard printed circuit board 310 so that each feed stalk printed circuit boards 222, 262-1, 262-2 extends forwardly from the feedboard printed circuit board 310.

As is known in the art, typically dipole radiators of a dipole radiating element are mounted at a distance of about one quarter of a wavelength corresponding to a center frequency of the operating frequency band of the dipole radiating element forwardly of a reflector 300. The arrangement shown in FIGS. 3A-3E allows the dipole radiators 274-1, 274-2 of the higher-band radiating element 250 to be mounted at this distance forwardly of the reflector 300, while also allowing the dipole radiators 234-1, 234-2 of the lower-band radiating element 210 to be mounted at a distance of one quarter of a wavelength corresponding to a center frequency of the lower operating frequency band forwardly of the reflector 300. If the lower-band is the above-described low-band operating frequency range (617-960 MHz or a subset thereof) and the higher-band is the above-described mid-band operating frequency range (1427-2690 MHz or a subset thereof), the dipole radiators 234-1, 234-2 of the lower-band radiating element 210 will typically be mounted about 2-3 times farther forwardly from the reflector 300 than are the dipole radiators 274-1, 274-2 of the higher-band radiating element 250.

Typically, the lower-band radiating element 210 may be part of a first array of first frequency band radiating elements (e.g., array 130-1 of FIG. 2A) and the higher-band radiating element 250 may be part of a first array of second frequency band radiating elements (e.g., array 140-2 of FIG. 2B). The feed stalk 260 of the higher-band radiating element 250 extends through an aperture 224 in the feed stalk 220 of the lower-band radiating element 210. In the embodiment of FIGS. 3A-3E, the first feed stalk printed circuit board 222 intersects the second feed stalk printed circuit board 262-1 at an angle of about +45° and intersects the third feed stalk printed circuit board 262-1 at an angle of about −45°.

As is also shown in FIG. 3A, the lower-band radiating element 210 (which may be part of a first array of first frequency band radiating elements) and the higher-band radiating element 250 (which may be part of a first array of second frequency band radiating elements) may each be mounted in front of a reflector 300 of a base station antenna. The higher-band radiating element 250 includes a feed stalk 260 and first through fourth higher-band dipole arms 276-1 through 276-4. The feed stalk 220 of the lower-band radiating element 210 extends in between the first and third of the higher-band dipole arms 276-1, 276-3. The feed stalk 220 of the lower-band radiating element 210 also extends in between the second and fourth of the higher-band dipole arms 276-2, 276-4.

As is further shown in FIG. 3A, the lower-band radiating element 210 (which may be part of a first array of first frequency band radiating elements) includes a first feed stalk printed circuit board 222 and the higher-band radiating element 250 (which may be part of a first array of second frequency band radiating elements) includes a second feed stalk printed circuit board 272-1 and a third feed stalk printed circuit board 272-2. The first feed stalk printed circuit board 222 intersects both the second feed stalk printed circuit board 272-1 and the third feed stalk printed circuit board 272-2.

Figure 3F:
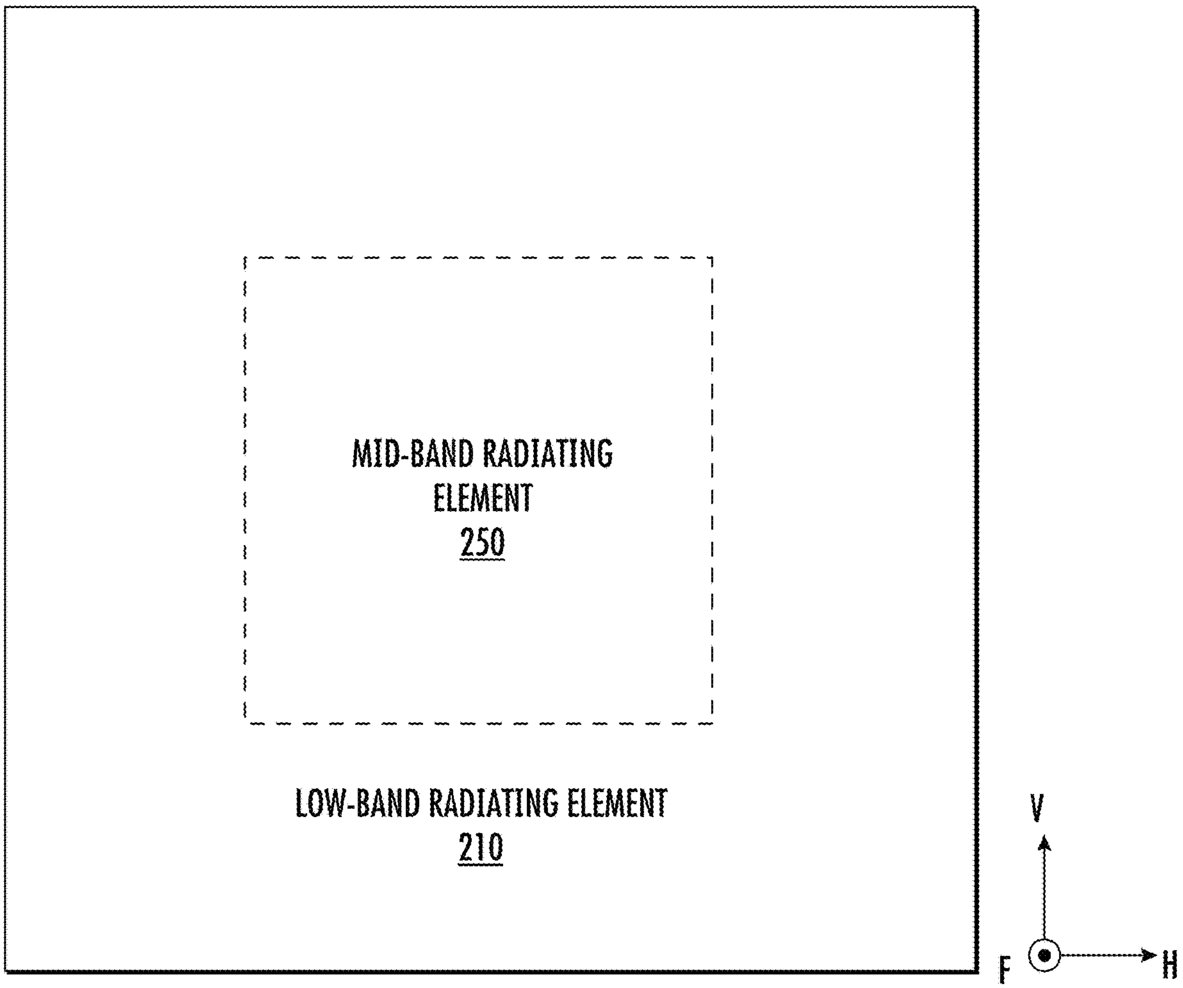
FIG. 3F is a schematic shadow front view of the multi-band radiating unit of FIG. 3A that illustrates how the lower-band radiating element may completely overlap the higher-band radiating element in the forward direction F.

FIG. 3A also illustrates that the lower-band radiating element 210 may overlap the higher-band radiating element 250 in the forward direction F (i.e., an axis that is perpendicular to the reflector 300 extends through both the lower-band radiating element 210 and the higher-band radiating element 250). In fact, the lower-band radiating element 210 may completely overlap the higher-band radiating element 250 in the forward direction F, meaning that all axes that are perpendicular to the reflector 300 that extend through the higher-band radiating element 250 also extend through the lower-band radiating element 210). FIG. 3F is a schematic shadow front view of the multi-band radiating unit 200 that illustrates how the lower-band radiating element 210 may completely overlap the higher-band radiating element 250 in the forward direction F. As shown in FIG. 3F, the higher-band radiating element 250 does not extend outward beyond the footprint of the lower-band radiating element 210 in either the horizontal direction H or the vertical direction V.

Notably, each radiating element 210, 250 of multi-band radiating unit 200 includes its own respective feed stalk 220, 260. The feed stalks 220, 260 may, but need not be, implemented using feed stalk printed circuit boards. In some embodiments, the feed stalk 220 of the lower-band radiating element 210 may be implemented using a single feed stalk printed circuit board 222, while the feed stalk 270 of the higher-band radiating element 250 is implemented using a pair of feed stalk printed circuit boards 262-1, 262-2.

While in the above discussion, the lower-band radiating element 210 is described as being a low-band radiating element and the higher-band radiating element 250 is described as being a mid-band radiating element, it will be appreciated that embodiments of the invention are not limited thereto. For example, in other embodiments, the lower-band radiating element 210 may be a mid-band radiating element and the higher-band radiating element 250 may be a high-band radiating element.

Figure 3G:
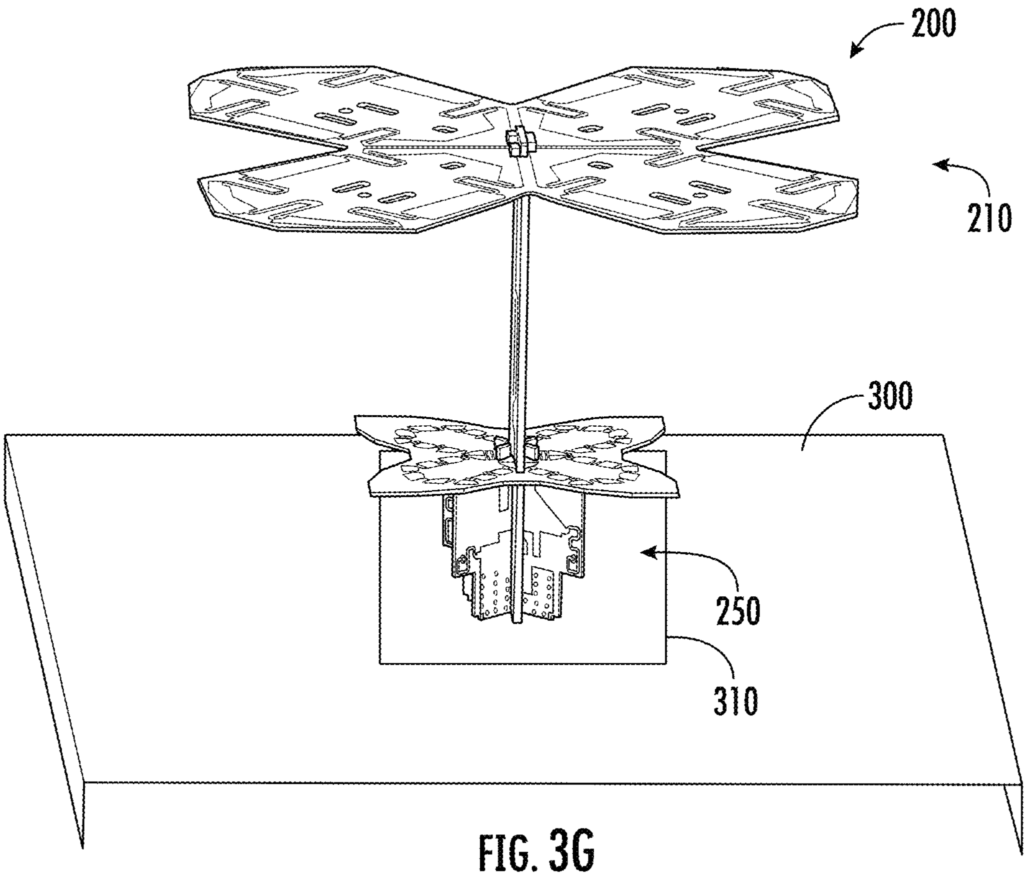
FIG. 3G is a perspective view of an implementation of the multi-band radiating unit of FIG. 3A.

FIG. 3G is a perspective view of one example implementation of the multi-band radiating unit 200 of FIG. 3A. As shown in FIG. 3G, the lower-band radiating element 210 may be implemented as a so-called "cloaked" radiating elements. One challenge in the design of multi-band base station antennas is reducing the effect of scattering of the RF signals at one frequency band by the radiating elements of other frequency bands. Scattering is undesirable as it may affect the shape of the generated antenna beams in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio of the antenna beams in undesirable ways.

Cloaking radiating elements refer to radiating elements that have reduced impact on the antenna beams generated by closely located radiating elements that transmit and receive signals in other frequency bands (i.e., reduced scattering). For example, U.S. Pat. Nos. 10,439,285 and 10,770,803 each disclose low-band radiating elements that operate in the 696-960 MHz frequency band that include dipole arms that are formed as a series of widened segments that are coupled by narrow inductive segments, which may be implemented as small, meandered trace segments on a printed circuit board. In each case, the narrow inductive segments act as high impedance elements for RF energy in the 1.7-2.7 GHz frequency band, rendering the low-band radiating elements substantially transparent to RF energy in that frequency range. The lower-band radiating element 210 shown in FIG. 3G has the cloaking design disclosed in the above-referenced U.S. Pat. No. 10,770,803. This cloaking design may make the dipole arms of the low-band radiating element 210 substantially transparent (invisible) to RF radiation emitted by the mid-band radiating element 250. In other embodiments, the lower-band radiating element 210 may be substantially transparent (invisible) to RF radiation emitted by the mid-band radiating element 250 and to radiation emitted by nearby high-band radiating elements (not shown). The high-band radiating elements may, for example, be mounted rearwardly of the low-band radiating element 210 as is done in the passive/active base station antenna system 100 of FIGS. 1A-1C.

The mid-band radiating element 250 shown in FIG. 3G may also have the cloaking design disclosed in the above-referenced U.S. Pat. No. 10,770,803 in example embodiments. This cloaking design may make the dipole arms of the mid-band radiating element 250 substantially transparent (invisible) to RF radiation emitted by nearby high-band radiating elements.

Figure 3H:
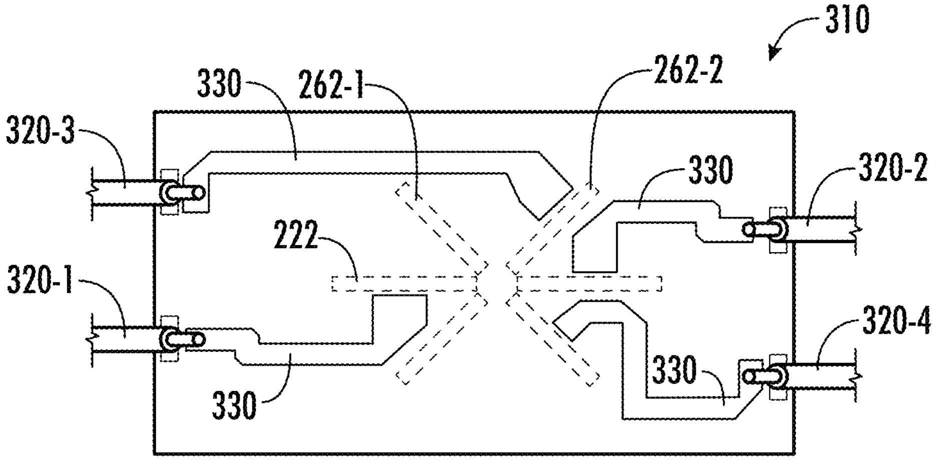
FIG. 3H is a plan view of a feedboard printed circuit board for the multi-band radiating unit of FIG. 3A.

FIG. 3H is a plan view of a feedboard printed circuit board 310 for feedboard printed circuit board 310 for FIG. 3A. As shown in FIG. 3H, a total of four coaxial cables 320-1 through 320-4 may terminate (i.e., be electrically connected to) the feedboard printed circuit board 310 for purposes of passing RF signals to and from the feedboard printed circuit board 310. The outer conductor of each coaxial cable 320 may be electrically connected to a ground plane on the feedboard printed circuit board 310 such as a ground plane layer that is on the rear side of the feedboard printed circuit board 310 (not visible in FIG. 3H). Ground structures on the feed stalk printed circuit boards 222, 262-1, 262-2 of the lower-band radiating element 210 and the higher-band radiating element 250 may be electrically connected to the ground plane layer of the feedboard printed circuit board 310.

The center conductors of first and second of the coaxial cables 320-1, 320-2 may be electrically connected to respective RF transmission lines 330 on the feed stalk printed circuit board 222 of the low-band radiating element 210. The center conductor of the third cable 320-3 may be electrically connected to an RF transmission line on the first feed stalk printed circuit board 262-1 of the mid-band radiating element 250, and the center conductor of the fourth cable 320-4 may be electrically connected to an RF transmission line on the second feed stalk printed circuit board 262-2 of the mid-band radiating element 250. Both the low-band radiating element 210 and the mid-band radiating element 250 may be mounted on the feedboard printed circuit board 310.

Figure 4A:
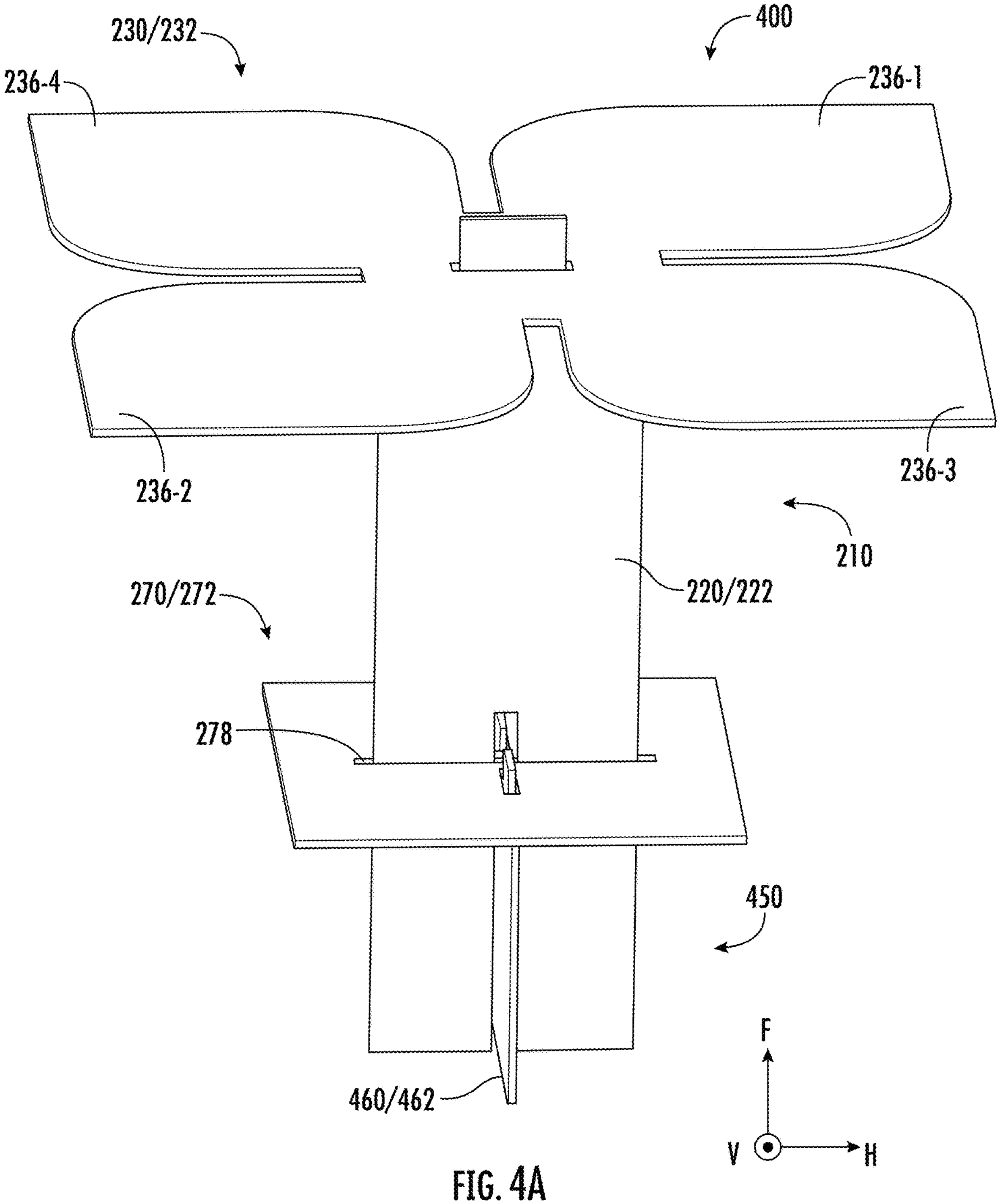
FIG. 4A is a schematic perspective view of a multi-band radiating unit according to further embodiments of the present invention.
Figure 4B:
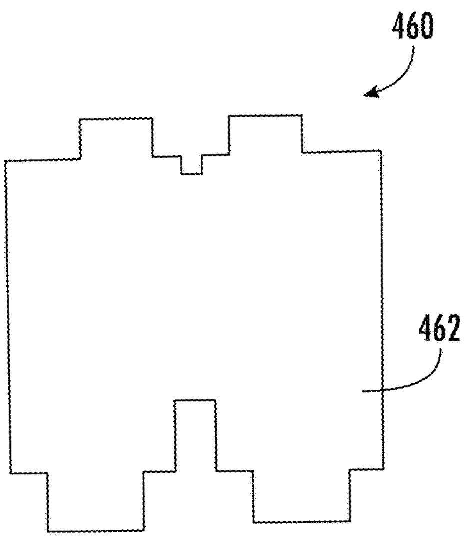
FIG. 4B is a schematic side view of the feed stalk of the higher-band radiating element that is included in the multi-band radiating unit of FIG. 4A.
Figure 4C:
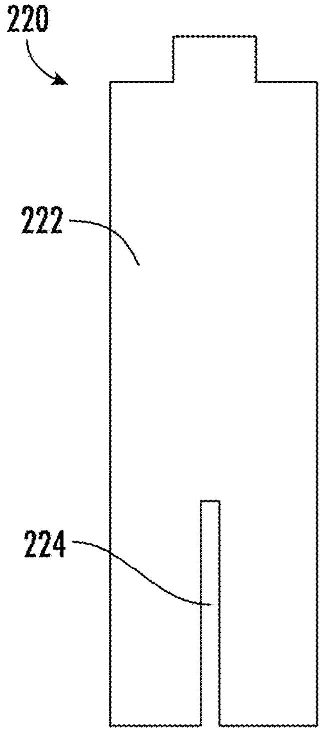
FIG. 4C is a schematic side view of the feed stalk of the lower-band radiating element that is included in the multi-band radiating unit of FIG. 4A.
Figure 4D:
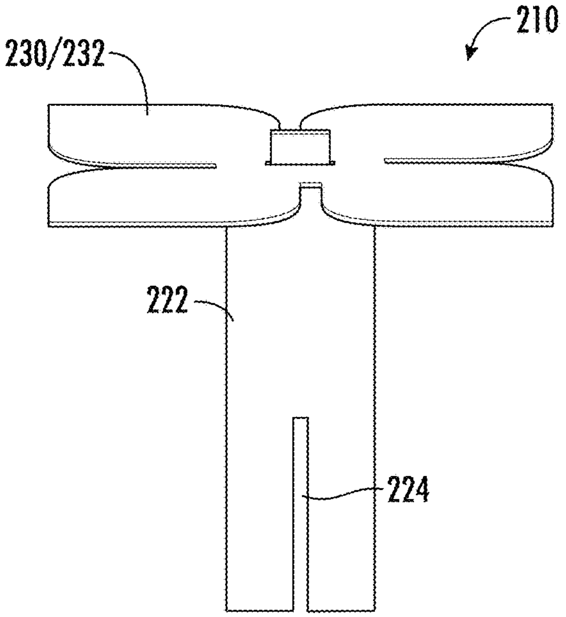
FIG. 4D is a schematic perspective view of the lower-band radiating element included in the multi-band radiating unit of FIG. 4A.
Figure 4E:
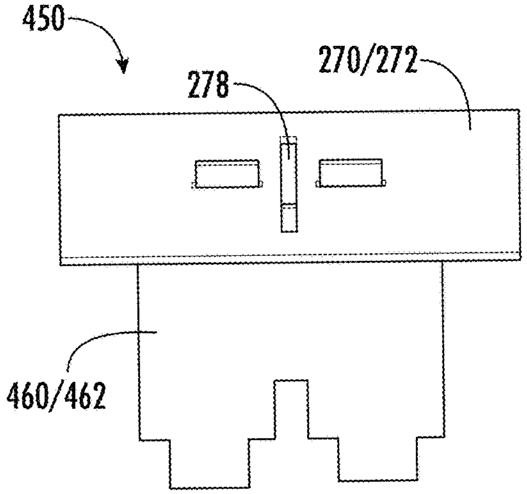
FIG. 4E is a schematic perspective view of the higher-band radiating element included in the multi-band radiating unit of FIG. 4A.

FIGS. 4A-4F illustrate a multi-band radiating unit 400 according to further embodiments of the present invention. In particular, FIG. 4A is a schematic perspective view of the multi-band radiating unit 400, while FIGS. 4B and 4C are schematic side views, respectively, of the feed stalks thereof. FIGS. 4D and 4E are schematic perspective views of the lower-band and higher-band radiating elements 210, 450, respectively, that are included in the multi-band radiating unit 400 of FIG. 4A. The multi-band radiating unit 400 may be mounted on a feedboard printed circuit board (not shown) that is mounted on a reflector (not shown) in the same manner that multi-band radiating unit 200 of FIGS. 3A-3E is mounted on a feedboard printed circuit board 310 that is mounted on a reflector 300.

As can be seen from FIGS. 4A-4E, the multi-band radiating unit 400 includes a first, lower-band, radiating element 210 and a second, higher-band, radiating element 450. The first, lower-band, radiating element 210 may be identical to the lower-band radiating element 210 of multi-band radiating unit 200, and hence further description thereof will be omitted.

The higher-band, radiating element 450 includes a feed stalk 460 and a radiating unit 270. The radiating unit 270 may be identical to the radiating unit 270 of multi-band radiating unit 200, and hence further description thereof will be omitted. The feed stalk 460 is implemented a single feed stalk printed circuit board 462. The single feed stalk printed circuit board 462 includes feed lines (not shown) for both the first and second dipole radiators 274-1, 274-2 of the higher-band radiating element 450.

As shown, the lower-band radiating element 210 may extend through the higher-band radiating element 450. In particular, the feed stalk printed circuit board 222 of the lower-band radiating element 210 may extend through the opening 274 in the dipole radiation printed circuit board 272 of the higher-band radiating element 450, and the feed stalk printed circuit board 462 of the higher-band radiating element 250 extends through the aperture 224 in the feed stalk printed circuit board 222 of the lower-band radiating element 210. As a result, the higher-band radiating element 450 is completely within the footprint of the lower-band radiating element 210. In the embodiment of FIGS. 4A-4E, the first feed stalk printed circuit board 222 intersects the second feed stalk printed circuit board 462 at an angle of about 90°

As the only difference between the multi-band radiating unit 200 of FIGS. 3A-3E and the multi-band radiating unit 400 of FIGS. 4A-4E is that the higher-band radiating element 450 of multi-band radiating unit 400 of FIGS. 4A-4E only includes one, instead of two, feed stalk printed circuit boards, further discussion of the multi-band radiating unit 400 of FIGS. 4A-4E will be omitted. It will be appreciated that the lower-band radiating element 210 may be part of a first array of first frequency band radiating elements (e.g., array 130-1 of FIG. 2A) and that the higher-band radiating element 450 may be part of a first array of second frequency band radiating elements (e.g., array 140-2 of FIG. 2B).

Figure 4F:
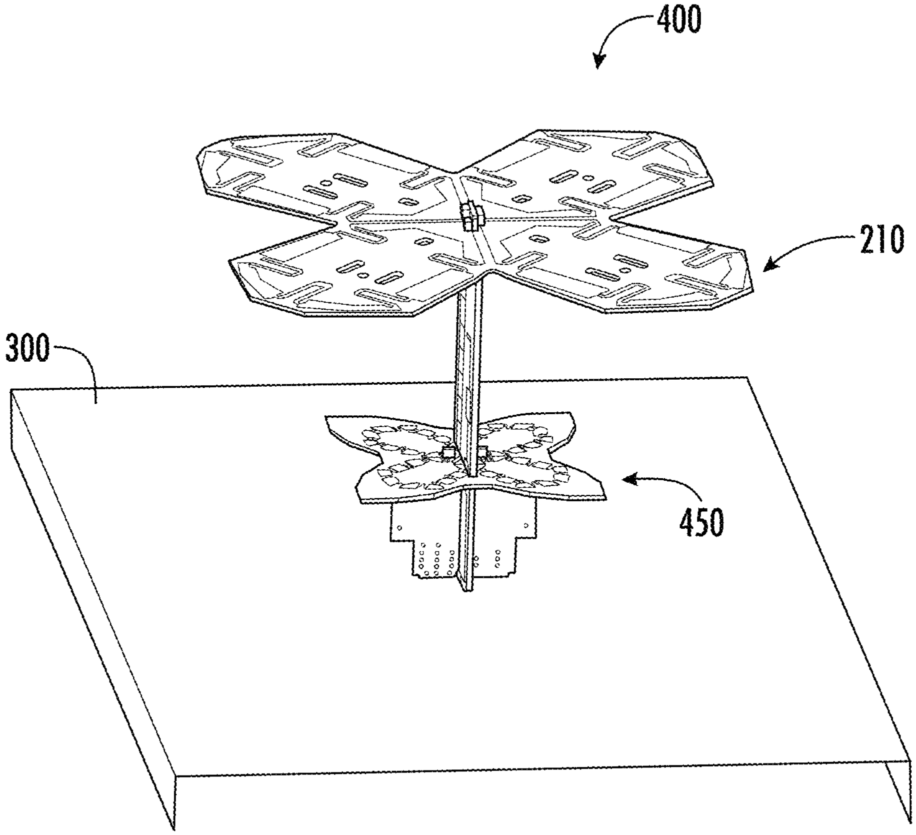
FIG. 4F is a perspective view of an implementation of the multi-band radiating unit of FIG. 4A.

FIG. 4F is a perspective view of an implementation of the multi-band radiating unit 400 of FIG. 4A, where the lower-band radiating element 210 is a low-band radiating element that is configured to operate in all or part of the 617-960 MHz frequency band, and the higher-band radiating element 450 is a mid-band radiating element that is configured to operate in all or part of the 1427-2690 MHz frequency band. As shown in FIG. 4F, the low-band radiating element 210 may be cloaked with respect to mid-band and/or high band radiation, and the mid-band radiating element 450 may be cloaked with respect to high band radiation.

FIG. 4G is a plan view of a feedboard printed circuit board 510 for the multi-band radiating unit 400 of FIG. 4A. The feedboard printed circuit board 510 may be similar to the feedboard printed circuit board 310 of FIG. 3H, with the primary difference being that the center conductors of both the third and fourth coaxial cables 320-3, 320-4 are electrically connected to respective RF transmission lines on the feed stalk printed circuit board 462 of the mid-band radiating element 450.

Figure 5A:
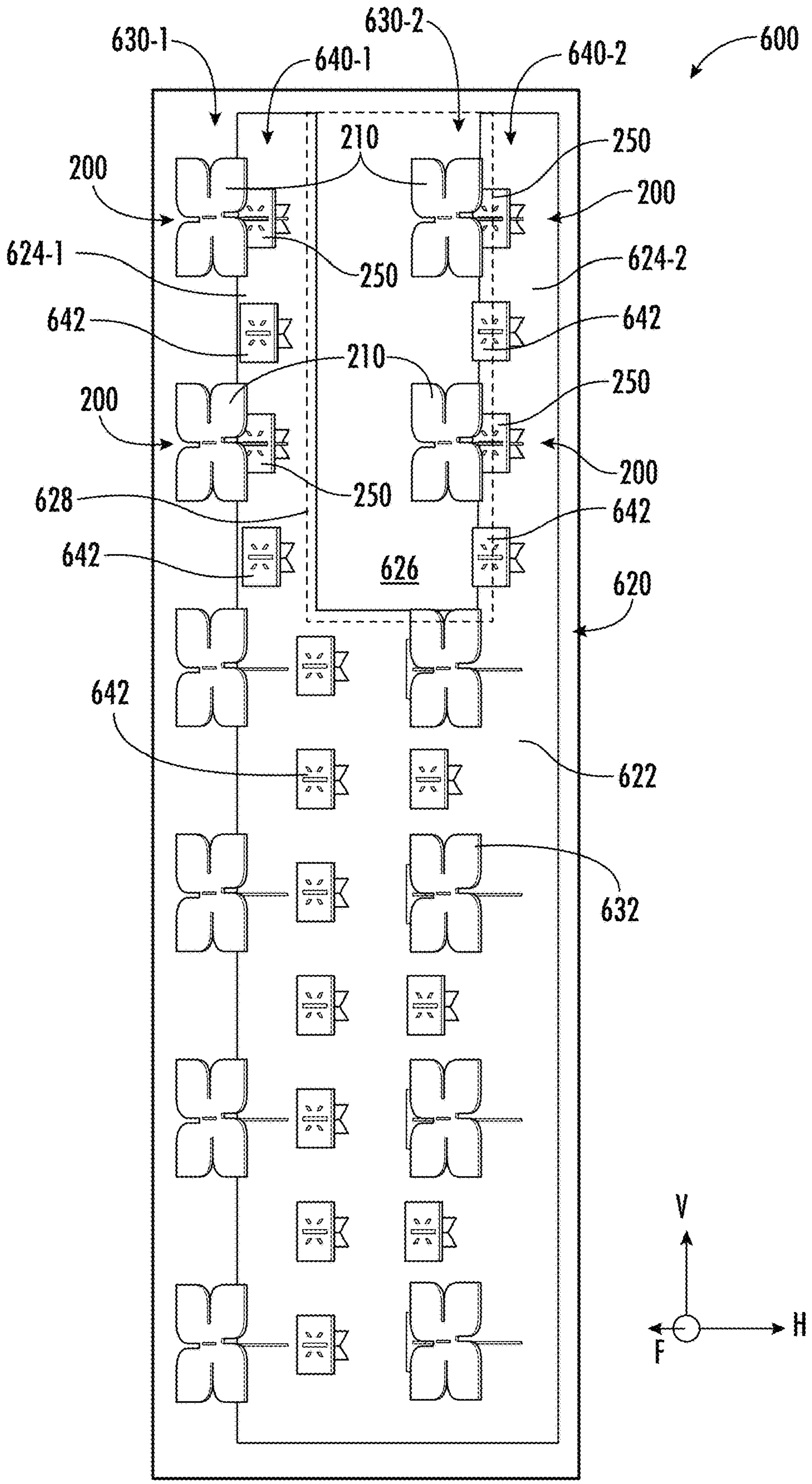
FIG. 5A is a schematic perspective view of a passive base station antenna according to embodiments of the present invention.

FIG. 5A is a schematic perspective view of a passive base station antenna 610 according to embodiments of the present invention. The passive base station antenna 610 may be used in place of the passive base station antenna 110 in the passive/active antenna system 100 of FIGS. 1A-1C. The passive base station antenna 610 includes four of the multi-band radiating units 200 according to embodiments of the present invention. As the passive base station antenna 610 is similar to the passive/active antenna system 100 of FIGS. 1A-1C, the description of FIG. 5A will focus on the differences between passive base station antenna 610 and the passive base station antenna 110. In FIG. 5A, the radome of the passive base station antenna 610 is omitted to show the internal components of thereof. While not shown, an active antenna module (see FIGS. 1A-1C) that includes a multi-column array of high band radiating elements that can perform active beamforming may be mounted behind the passive base station antenna 610.

The passive base station antenna 610 includes two arrays 630-1, 630-2 of low-band radiating elements 632, 210 and two arrays 640-1, 640-2 of mid-band radiating elements 642, 250 (as opposed to the four arrays of mid band radiating elements included in the passive base station antenna 110 of passive/active antenna system 100). The passive base station antenna 610 includes a passive reflector assembly 620 that includes a main reflector 622 and spaced-apart first and second reflector strips 624-1, 624-2 that extend vertically from respective first and second opposed sides of the main reflector 622. An opening 626 is defined between the first and second reflector strips 624-1, 624-2. A frequency selective surface 628 may cover the opening 626. The frequency selective surface 628 may be identical to the frequency selective surface 128 discussed above with reference to FIG. 1B, and hence further description thereof will be omitted here.

As shown in FIG. 5A, the bottom five low-band radiating elements in each low-band array 630 are mounted to extend forwardly from the main reflector 622 and are implemented using conventional low-band radiating elements 632. Likewise, the bottom seven mid-band radiating elements in each mid-band array 640 are mounted to extend forwardly from the main reflector 622 and are implemented using conventional mid-band radiating elements 642. The remaining two low-band radiating elements in each low-band array 630 and the remaining four mid-band radiating elements in each mid-band array 640 are mounted on the first and second reflector strips 624-1, 624-2. All four of these low-band radiating elements and four of the mid-band radiating elements that are mounted on the reflector strips 624 are implemented as multi-band radiating units 200 according to embodiments of the present invention. Accordingly, these radiating elements in FIG. 5A are identified using reference numerals 210 and 250. Using the multi-band radiating units 200 according to embodiments of the present invention to implement all of the low-band radiating elements 210 and some of the mid-band radiating elements 250 that are mounted on the reflector strips 624-1, 624-2 allows these radiating elements to take up less room on the reflector strips 624, which allows the width of each reflector strip 124 to be reduced. This may improve the electronic scanning performance of the multi-column array of high-band radiating elements that is included in the active antenna module 650 of passive/active antenna system 600.

It should be noted that in the embodiment shown in FIG. 5A, the low-band radiating elements 210 included in each multi-band radiating unit 200 have "straight" feed stalks that extend solely in the forward direction F. It will be appreciated, however, that the straight feed stalks shown in FIG. 5A may be replaced in other embodiments with so-called "tilted" feed stalks that extend both in the forward direction F and in the horizontal direction H. In particular, the feed stalk for each low-band radiating element 210 may extend "inwardly" in the horizontal direction (i.e., toward a longitudinal axis that bisects the passive base station antenna 610). The use of such tilted feed stalks positions the dipole radiator printed circuit board 232 for each low-band radiating element 210 more toward the center of the passive base station antenna 610, which allows each low-band radiating element 210 to be mounted closer to the side of the passive base station antenna 610. The dipole radiator printed circuit board 232 for each low-band radiating element 210 may thus be positioned forwardly of the frequency selective surface 628, which may act as a reflector for the four low-band radiating elements 210 that are included in the four multi-band radiating units 200 implemented in passive base station antenna 610.

Figure 5B:
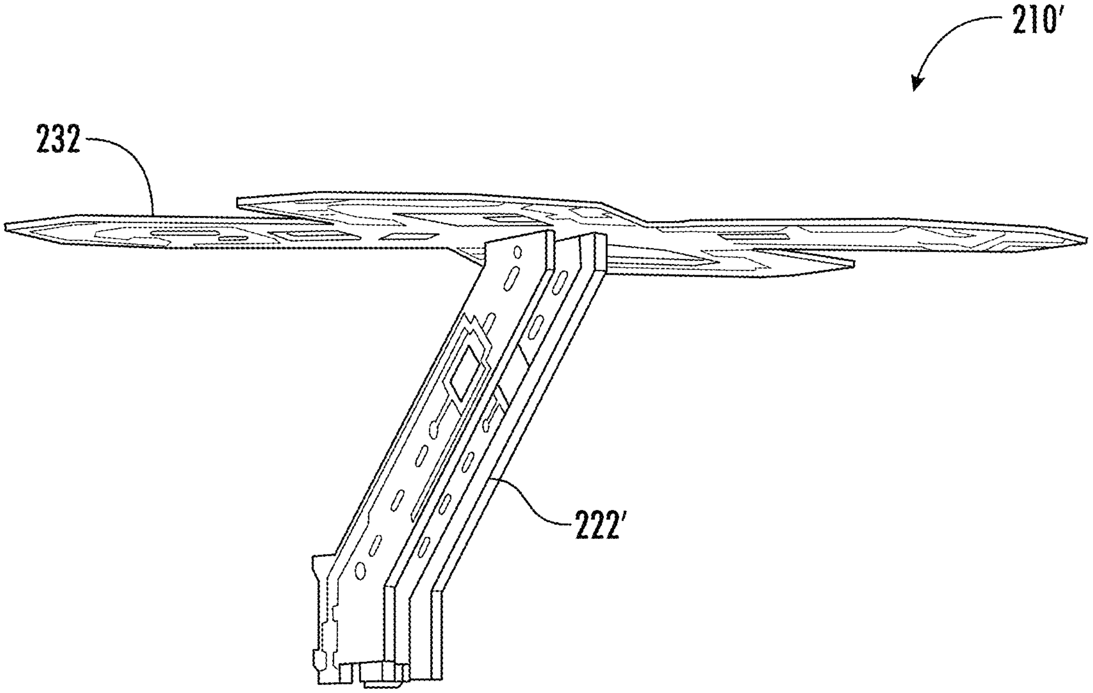
FIGS. 5B and 5C are schematic side perspective views of an alternative low-band radiating element that may be used in the multi-band radiating units of FIG. 5A.
Figure 5C:
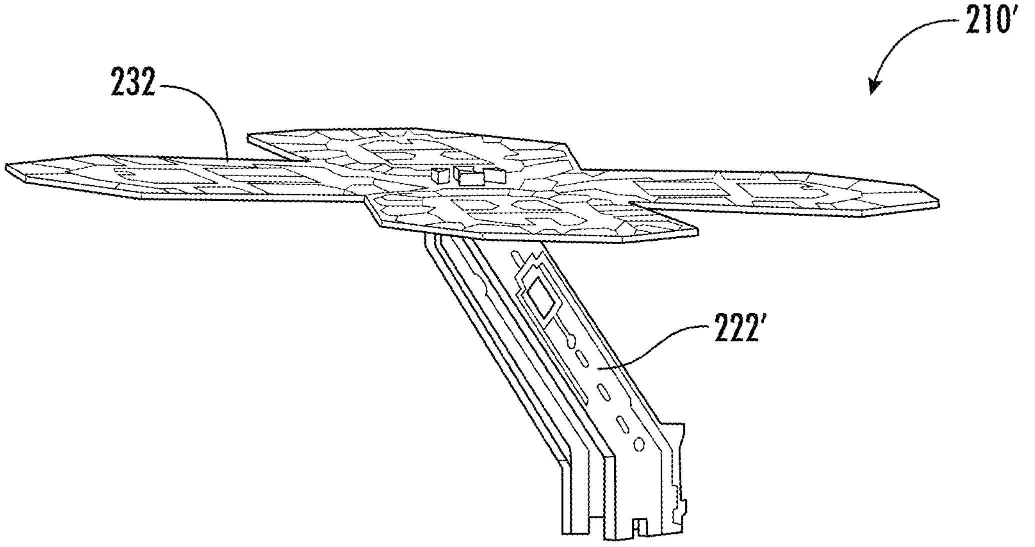

FIGS. 5B and 5C are schematic side views of an alternate low-band radiating element 210' that may be used in place of the low-band radiating element 210. The low-band radiating element 210' includes a tilted feed stalk 222'. A dipole radiator printed circuit board 232 is mounted on the distal end of the tilted feed stalk 222'. The alternate low-band radiating element 210' may be identical to the low-band radiating element 210 shown in FIGS. 3A and 3D except that radiating element 210' includes the tilted feed stalk 222', and hence further description thereof will be omitted. When alternate low-band radiating element 210' is used, the slot 278 in the dipole radiator printed circuit board 272 of the higher-band radiating element 250 may need to be enlarged to accommodate the tilt in the feed stalk 222'.

Figure 6:
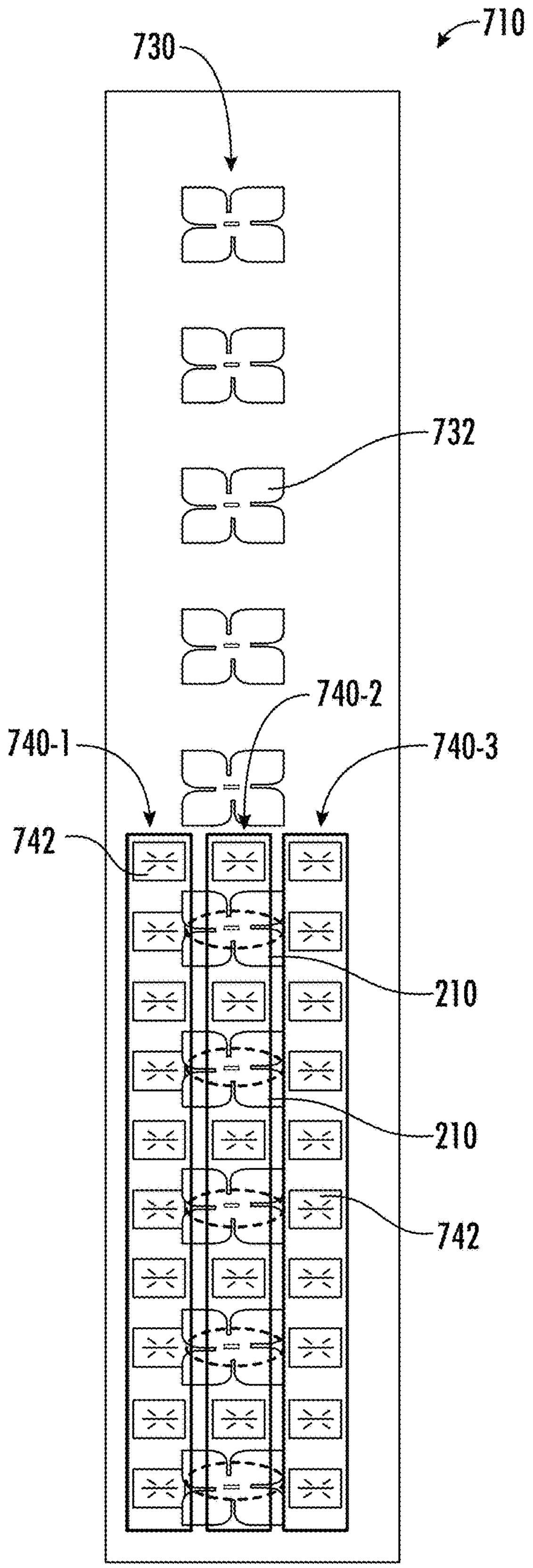
FIG. 6 is a schematic plan view of an antenna assembly of a base station antenna according to embodiments of the present invention that includes one array of low-band radiating elements and three arrays of mid-band radiating elements.

FIG. 6 is a schematic plan view of an antenna assembly 710 of a base station antenna according to further embodiments of the present invention that includes one array 730 of low-band radiating elements 732 and three arrays 740-1 through 740-3 of mid-band radiating elements 742. Typically, cellular operators expect antenna that include one low-band array and three mid-band arrays to have a width of 300 mm or less. In order to meet this width requirement, two of the mid-band arrays 740 are typically vertically stacked, requiring that one of the mid-band arrays 740 be positioned in the upper half of the antenna. The longer coaxial cables that are used to feed this "upper" array have increased insertion loss, which decreases the gain of the antenna beams generated by the upper mid-band array.

As shown in FIG. 6, by using the multi-band radiating units (e.g., the multi-band radiating units 210) according to embodiments of the present invention, all three mid-band arrays 740-1 through 740-3 may be mounted in the lower end of the antenna 700. As such, short (low-loss) coaxial cables may be used to feed all three mid-band arrays 740, and hence all three mid-band arrays 740 may have high gain.

Figure 7A:
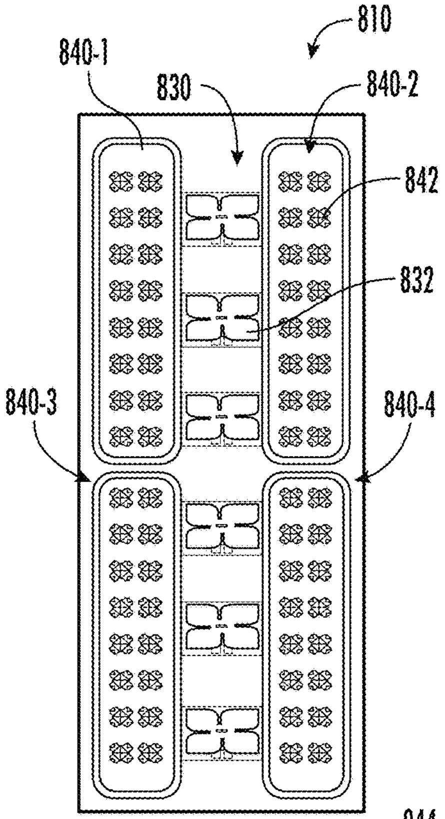
FIG. 7A is a schematic plan view of an antenna assembly of a conventional base station antenna that includes four arrays of mid-band radiating elements that generate antenna beams having 45° azimuth half power beamwidths and an array of low-band radiating elements that generates antenna beams having 65° azimuth half power beamwidths.

FIG. 7A is a schematic plan view of an antenna assembly 810 of a conventional base station antenna that includes an array 830 of low-band radiating elements 832 and four arrays 840-1 through 840-4 of mid-band radiating elements 842. As shown in FIG. 7A, each array mid-band 840 includes two mid-band radiating elements per row, which allows each array to generate antenna beams having azimuth half power beamwidths ("azimuth HPBW") of about 45°. The mid-band arrays 840 are stacked vertically, with array 840-1 being stacked above array 840-3, are array 840-2 being stacked above array 840-4. While not shown in FIG. 7A, a linear array of low-band radiating elements may also be added to the antenna that extends vertically down the middle of the antenna.

Due to the vertical stacking of the mid-band arrays 840, it typically is not possible to add more mid-band radiating elements to each array 840, since doing so increases the length of what may already be a very long antenna. As such, it may be difficult to increase the gain by shrinking the beamwidth in the elevation plane. Moreover, the use of two radiating elements per row to generate antenna beams having 45° azimuth HPBWs tends to result in antenna beams having azimuth HPBWs that are somewhat larger than 45°. This may also result in sub-optimum gain. Additionally, there is only room for one array 830 of low-band radiating elements 832 without excessively expanding the width of the antenna. Since only one low-band array 830 is provided, the low-band array 830 has a 65° azimuth HPBW, which results in reduced gain and potential interference with other adjacent cells.

Figure 7B:
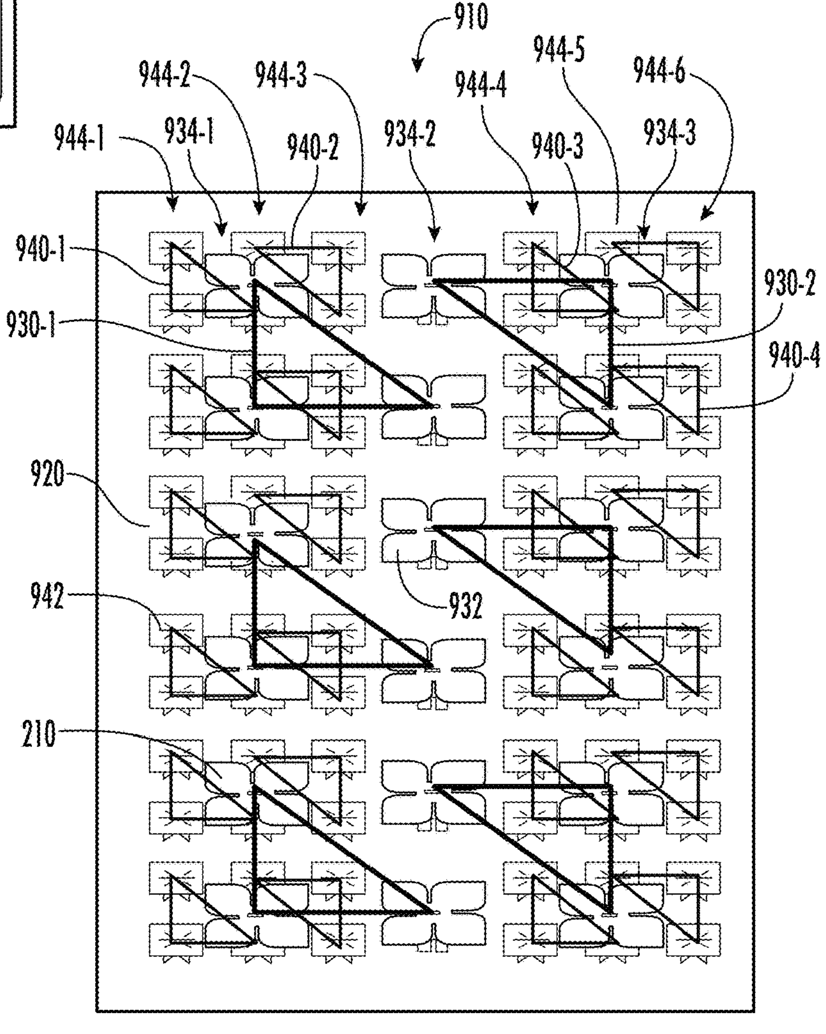
FIG. 7B is a schematic plan view of a base station antenna according to embodiments of the present invention that includes four arrays of mid-band radiating elements that generate antenna beams having 45° azimuth half power beamwidths and two arrays of low-band radiating elements that generate antenna beams having 45° azimuth half power beamwidths.

FIG. 7B is a schematic plan view of an antenna assembly 910 of a base station antenna according to embodiments of the present invention that can be used in place of the antenna assembly of FIG. 7A. The antenna assembly 910 includes three columns 934-1 through 934-3 of low-band radiating elements 932 and six columns 944-1 through 944-6 of mid-band radiating elements 942. Triangles have been added to FIG. 7B that illustrate the radiating elements that are part of the different arrays, and the reference numerals designating each array 930, 940 point to one of the triangles of the array. As shown, all of the low-band radiating elements 932 in the left column 934-1 as well as half of the low-band radiating elements 932 in the middle column 934-2 form a first low-band array 930-1. Similarly, all of the low-band radiating elements 932 in the right column 934-3 as well as the other half of the low-band radiating elements 932 in the middle column 934-2 form a second low-band array 930-2. Both of these arrays 930-1, 930-2 may generate antenna beams having an azimuth HPBW of about 45°. In a similar fashion, the six columns 944-1 through 944-6 of mid-band radiating elements 942 are arranged to form four arrays 940-1 through 940-4 of mid-band radiating elements 942, each of which is configured to generate antenna beams having an azimuth HPBW of about 45°. As shown in FIG. 7B, this arrangement is made possible because the left and right columns 934-1, 934-3 of low band radiating elements 932 are implemented using the multi-band radiating units according to embodiments of the present invention (e.g., multi-band radiating units 200).

As shown in FIG. 7B, the antenna assembly 910 includes a reflector 920, first through third columns 934-1 through 934-3 of first frequency band radiating elements 932 that are arranged from left to right on the reflector 920 in numerical order, and first through sixth columns 944-1 through 944-6 of second frequency band radiating elements 942 that are also arranged from left to right on the reflector 920 in numerical order. The first frequency band radiating elements 932 may be low-band radiating elements and the second frequency band radiating elements 942 may be mid-band radiating elements in example embodiments. The first through third columns 934-1 through 934-3 of first frequency band radiating elements form first and second arrays 930-1, 930-2 of first frequency band radiating elements 932, and the first through sixth columns 944-1 through 944-6 of second frequency band radiating elements 942 form first through fourth arrays 940-1 through 940-4 of second frequency band radiating elements 942.

The base station antennas according to embodiments of the present invention that include integrated radiating elements (e.g., integrated low-band and mid-band radiating elements) may provide a number of advantages. For example, in some cases, the integrated radiating elements may allow more of the arrays to be positioned in the bottom portion of a base station antenna. As discussed above, this may reduce costs (since shorter coaxial cables may be used to feed these arrays) and also increases the gain of the relocated arrays (since the shorted coaxial cables exhibit lower insertion losses). The integrated radiating elements according to embodiments of the present invention also reduce costs by using fewer feed stalks, and can reduce the overall size of the base station antenna in some cases. Additionally, the multi-band radiating units according to embodiments of the present invention may improve the RF performance of passive/active antenna systems by allowing for the use of smaller reflector strips (which may improve the performance of a high-band array mounted behind a passive reflector structure).

The present invention has been described above with reference to the accompanying drawings. The present invention is not limited to the illustrated embodiments. Rather, these embodiments are intended to fully and completely disclose the present invention to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," "coupled," and the like can mean either direct or indirect attachment or coupling between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A base station antenna comprising:

a first array having a plurality of first frequency band radiating elements; and a second array having a plurality of second frequency band radiating elements, the second frequency band being different than the first frequency band, wherein a first of the first frequency band radiating elements includes a first feed stalk and a first of the second frequency band radiating elements includes a second feed stalk that extends through an aperture in the first feed stalk, wherein the first of the first frequency band radiating elements comprises a cross-dipole radiating elements that includes a first dipole arm and a second dipole arm that each extend along a first axis to form a first dipole radiator and a third dipole arm and a fourth dipole arm that each extend along a second axis to form a second dipole radiator, the second axis extending perpendicular to the first axis, wherein the first of the second frequency band radiating elements includes a dipole radiator printed circuit board, and the first feed stalk extends through an opening in the dipole radiator printed circuit board.

2. The base station antenna of claim 1, further comprising a frequency selective surface mounted rearward of the first of the first frequency band radiating elements and rearward of the first of the second frequency band radiating elements, and a third antenna array having a plurality of third frequency band radiating elements that are mounted rearward of the frequency selective surface, where the third frequency band radiating elements are configured to operate in at least a portion of the 3.1-5.8 GHz frequency band.

3. The base station antenna of claim 2, wherein the frequency selective surface is configured to be substantially transparent to RF energy in the third frequency band and to substantially reflect RF energy in at least one of the first and second frequency bands.

4. A base station antenna comprising:

a first array having a plurality of first frequency band radiating elements; and a second array having a plurality of second frequency band radiating elements, the second frequency band being different than the first frequency band, wherein a first of the first frequency band radiating elements includes a first feed stalk and a first of the second frequency band radiating elements includes a second feed stalk that extends through an aperture in the first feed stalk, wherein the first feed stalk comprises a first feed stalk printed circuit board and the second feed stalk comprises a second feed stalk printed circuit board.

5. The base station antenna of claim 4, wherein the first of the second frequency band radiating elements includes a dipole radiator printed circuit board, and the first feed stalk printed circuit board extends through an opening in the dipole radiator printed circuit board.

6. The base station antenna of claim 4, wherein the first of the second frequency band radiating elements further includes a third feed stalk printed circuit board that extends through the aperture in the first feed stalk.

7. The base station antenna of claim 4, wherein the first feed stalk printed circuit board is the only feed stalk printed circuit board included in the first of the first frequency band radiating elements.

8. A base station antenna comprising:

a first array having a plurality of first frequency band radiating elements; and a second array having a plurality of second frequency band radiating elements, the second frequency band being different than the first frequency band, wherein a first of the first frequency band radiating elements includes a first feed stalk and a first of the second frequency band radiating elements includes a second feed stalk that extends through an aperture in the first feed stalk, wherein the first of the first frequency band radiating elements comprises a first crossed-dipole radiating element, the first of the second frequency band radiating elements comprises a second crossed-dipole radiating element, a first dipole radiator of the second crossed-dipole radiating element overlaps, in a forward direction, a first dipole radiator of the first crossed-dipole radiating element, and a second dipole radiator of the second crossed-dipole radiating element overlaps, in the forward direction, a second dipole radiator of the first crossed-dipole radiating element.

9. A base station antenna comprising:

a reflector;

a first cross-dipole radiating element that is configured to operate in a first frequency band, the first cross-dipole radiating element including a first feed stalk that extends in a forward direction and a first dipole arm and a second dipole arm that each extend along a first axis to form a first dipole radiator and a third dipole arm and a fourth dipole arm that each extend along a second axis to form a second dipole radiator, the second axis extending perpendicular to the first axis; and a second radiating element that is configured to operate in a second frequency band, the second radiating element including a second feed stalk that extends in the forward direction and fifth through eighth dipole arms, the second frequency band being different than the first frequency band, wherein the first feed stalk extends in between the fifth dipole arm and the seventh dipole arm.

10. The base station antenna of claim 9, wherein the first feed stalk also extends in between the sixth dipole arm and the eighth dipole arm.

11. The base station antenna of claim 9, wherein the first feed stalk comprises a first feed stalk printed circuit board and the second feed stalk comprises a second feed stalk printed circuit board.

12. The base station antenna of claim 11, wherein the first cross-dipole radiating element includes a dipole radiator printed circuit board, and the first feed stalk printed circuit board extends through an opening in the dipole radiator printed circuit board.

13. The base station antenna of claim 9, wherein the first feed stalk intersects the second feed stalk at an angle of about 90°.

14. The base station antenna of claim 9, wherein the second radiating element further includes a third feed stalk printed that extends through the aperture in the first feed stalk.

15. The base station antenna of claim 14, wherein the first feed stalk intersects the second feed stalk at an angle of about 45° and intersects the third feed stalk at an angle of about −45°.

16. The base station antenna of claim 9, wherein the first cross-dipole radiating element and the second radiating element are mounted on a feedboard printed circuit board, and an axis that is perpendicular to a major surface of the feedboard printed circuit board extends through a center of the first of the first cross-dipole radiating element and through a center of the second radiating element.

17. A multi-band radiating unit, comprising:

a first cross-dipole radiating element that includes a first dipole radiator, a second dipole radiator and a first feed stalk printed circuit board that has feed lines for both the first dipole radiator and the second dipole radiator; and a second cross-dipole radiating element that third dipole radiator and a fourth dipole radiator, a second feed stalk printed circuit board and a third feed stalk printed circuit board, wherein the first feed stalk printed circuit board intersects the second feed stalk printed circuit board and the third feed stalk printed circuit board, and wherein the first and second dipole radiators are configured to operate in a different frequency band than are the third and fourth dipole radiators.

18. The multi-band radiating unit of claim 17, wherein the third and fourth dipole radiators are implemented on a dipole radiator printed circuit board, and the first feed stalk printed circuit board extends through an opening in the dipole radiator printed circuit board.

19. The multi-band radiating unit of claim 17, wherein the first feed stalk printed circuit board is the only feed stalk printed circuit board included in the first radiating element.

20. The multi-band radiating unit of claim 17, wherein the first feed stalk printed circuit board is mounted to extend forwardly from a major surface of a feedboard printed circuit board, the major surface extending in a horizontal direction and a vertical direction, and a distal end of the first feed stalk printed circuit board is offset from a base of the first feed stalk printed circuit board in the forward direction and in at least one of the horizontal and vertical directions.

* * * * *